United States Patent [19]

Plasse

[11] Patent Number: 4,614,026

[45] Date of Patent: Sep. 30, 1986

[54] PROCESS FOR MAKING LAMINAR BATTERIES

[75] Inventor: Paul A. Plasse, Lexington, Mass.

[73] Assignee: Polaroid Corporation, Cambridge, Mass.

[21] Appl. No.: 749,412

[22] Filed: Jun. 27, 1985

Related U.S. Application Data

[62] Division of Ser. No. 295,269, Aug. 24, 1981, Pat. No. 4,539,275.

[51] Int. Cl.4 .............................................. H01M 6/00
[52] U.S. Cl. .................................... 29/623.3; 29/623.4
[58] Field of Search ............... 29/623.3, 623.4, 623.1, 29/623.2, 623.5

[56] References Cited

U.S. PATENT DOCUMENTS

| | | | |
|---|---|---|---|
| 3,708,349 | 1/1973 | Macaulay et al. | 136/175 |
| 3,775,188 | 11/1973 | Oltman et al. | 136/175 |
| 4,019,251 | 4/1977 | McCole | 29/623.2 |
| 4,086,400 | 4/1978 | Hyland et al. | 429/122 |
| 4,105,831 | 8/1978 | Plasse | 429/86 |
| 4,119,770 | 10/1978 | Land | 429/152 |
| 4,125,684 | 11/1978 | Land | 429/122 |
| 4,125,685 | 11/1978 | Bloom et al. | 429/122 |
| 4,152,825 | 5/1979 | Bruneau | 29/623.2 |
| 4,161,815 | 7/1979 | Land et al. | 29/623.4 |
| 4,235,684 | 11/1980 | Harada et al. | 204/79 |
| 4,254,191 | 3/1981 | Kniazzeh | 429/162 |
| 4,256,813 | 3/1981 | Kniazzeh | 429/86 |
| 4,262,825 | 4/1981 | Jacobson et al. | 222/503 |

Primary Examiner—Charles F. Lefevour
Attorney, Agent, or Firm—Gaetano D. Maccarone

[57] ABSTRACT

Laminar electrical cells and batteries, each cell of which comprises a first electrode formed as a porous layer of electrochemically active particles on an electrically conductive, electrochemically inactive substrate coextensive with the particle layer. The electrochemically inactive substrate is adhered around its periphery to the borders of an aperture in an electrically insulating frame. A separator for each cell overlies the active particle layer of the first electrode and has borders extending beyond the borders of the first electrode and within the borders of the insulating frame. A second electrode for each cell comprises a slurry of electrochemically active particles in contact with the other side of the separator. Methods of making the above cells and batteries from elongated webs of electrically insulating ones of the constituent materials of the cells.

6 Claims, 30 Drawing Figures

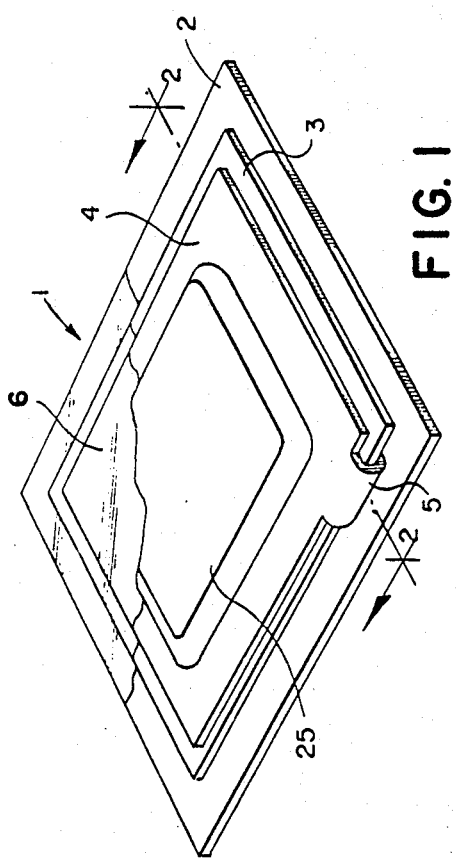
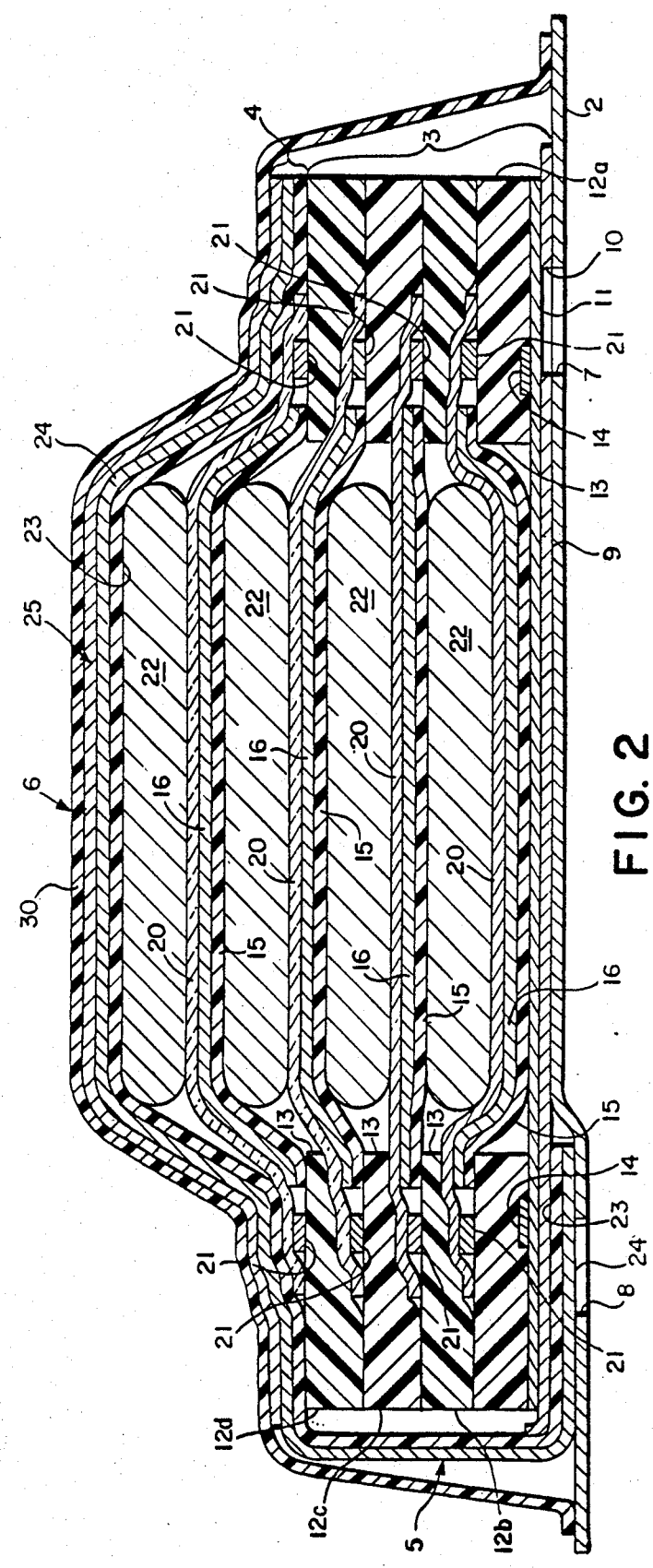
FIG. 1
FIG. 2

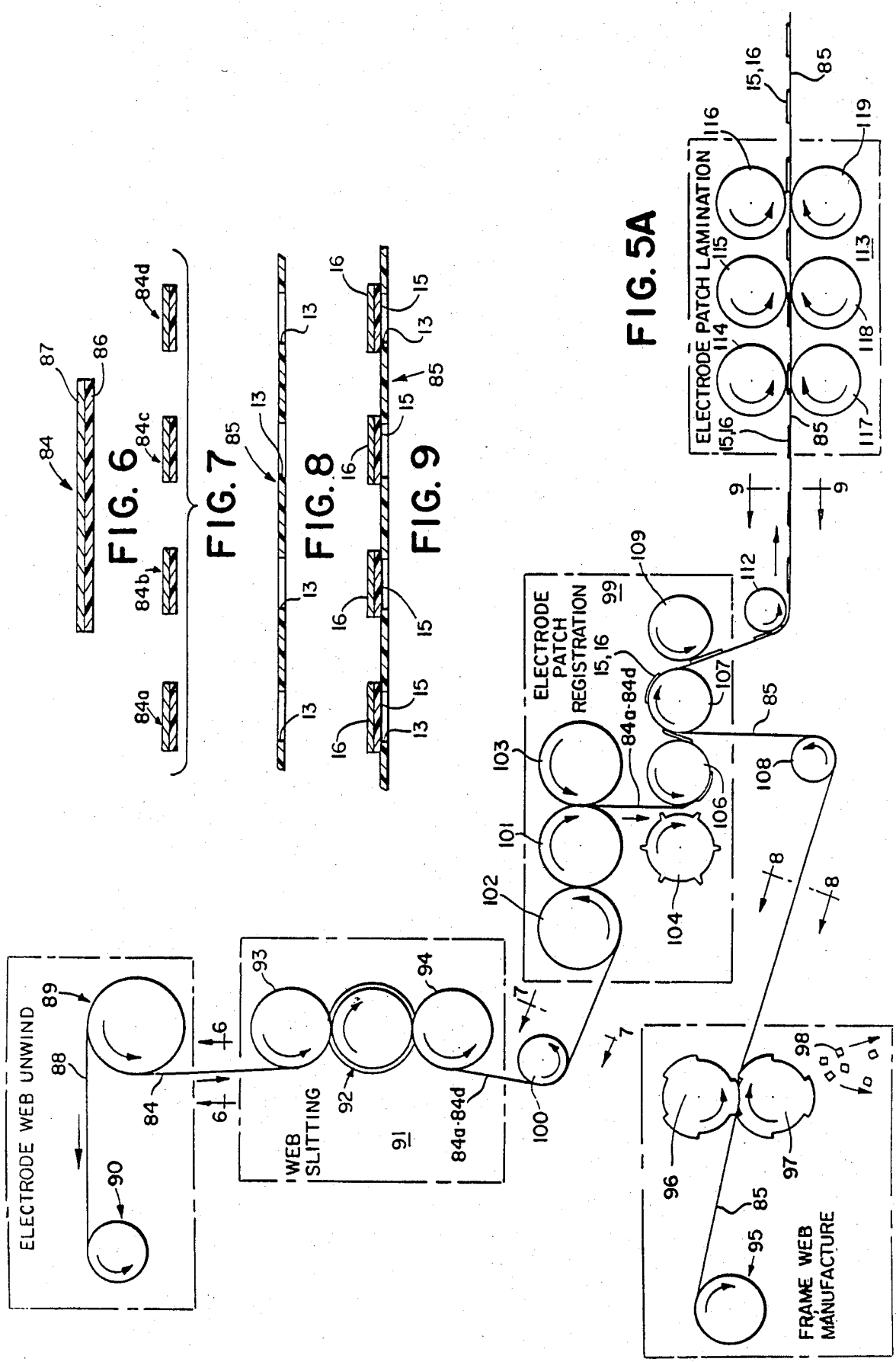

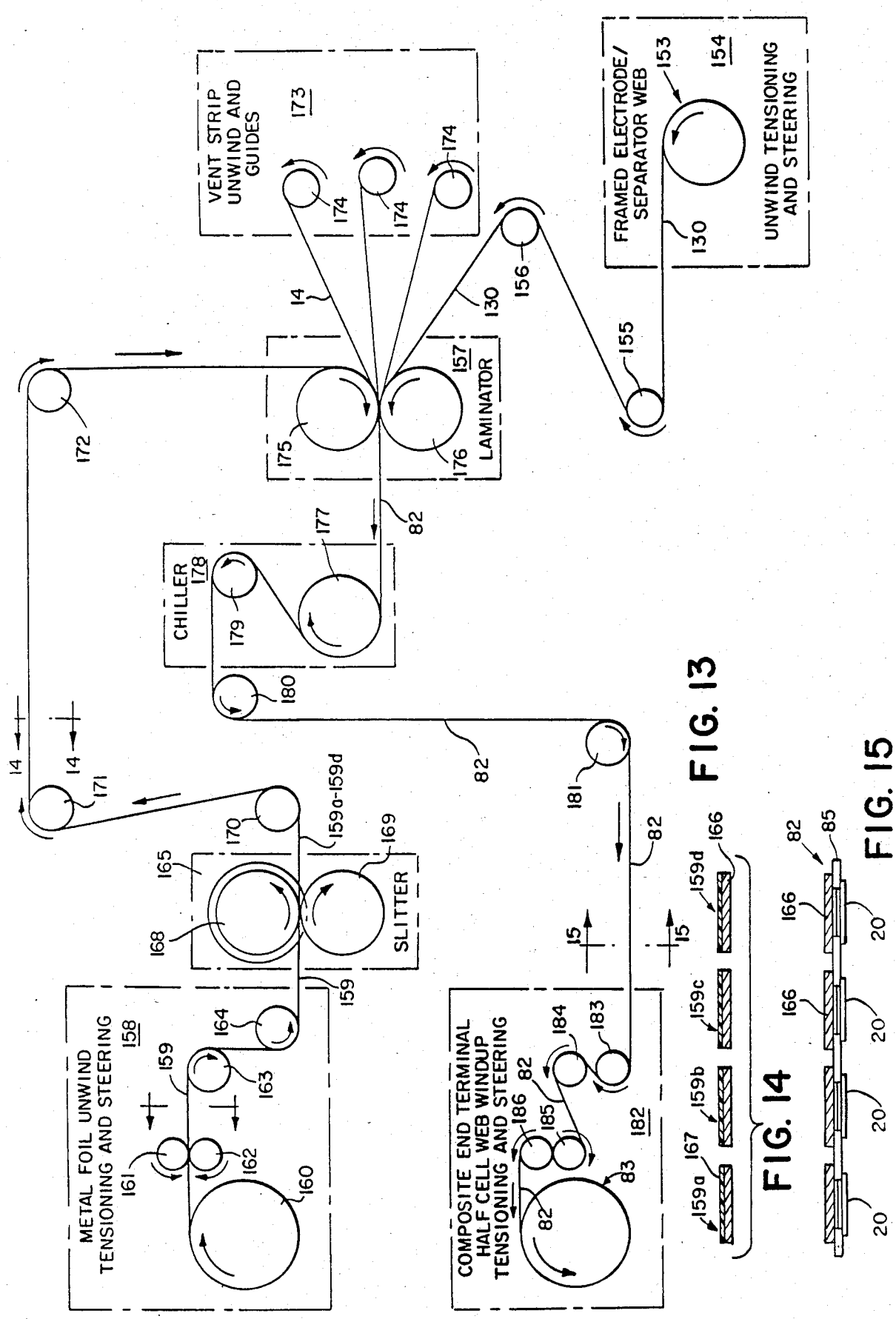

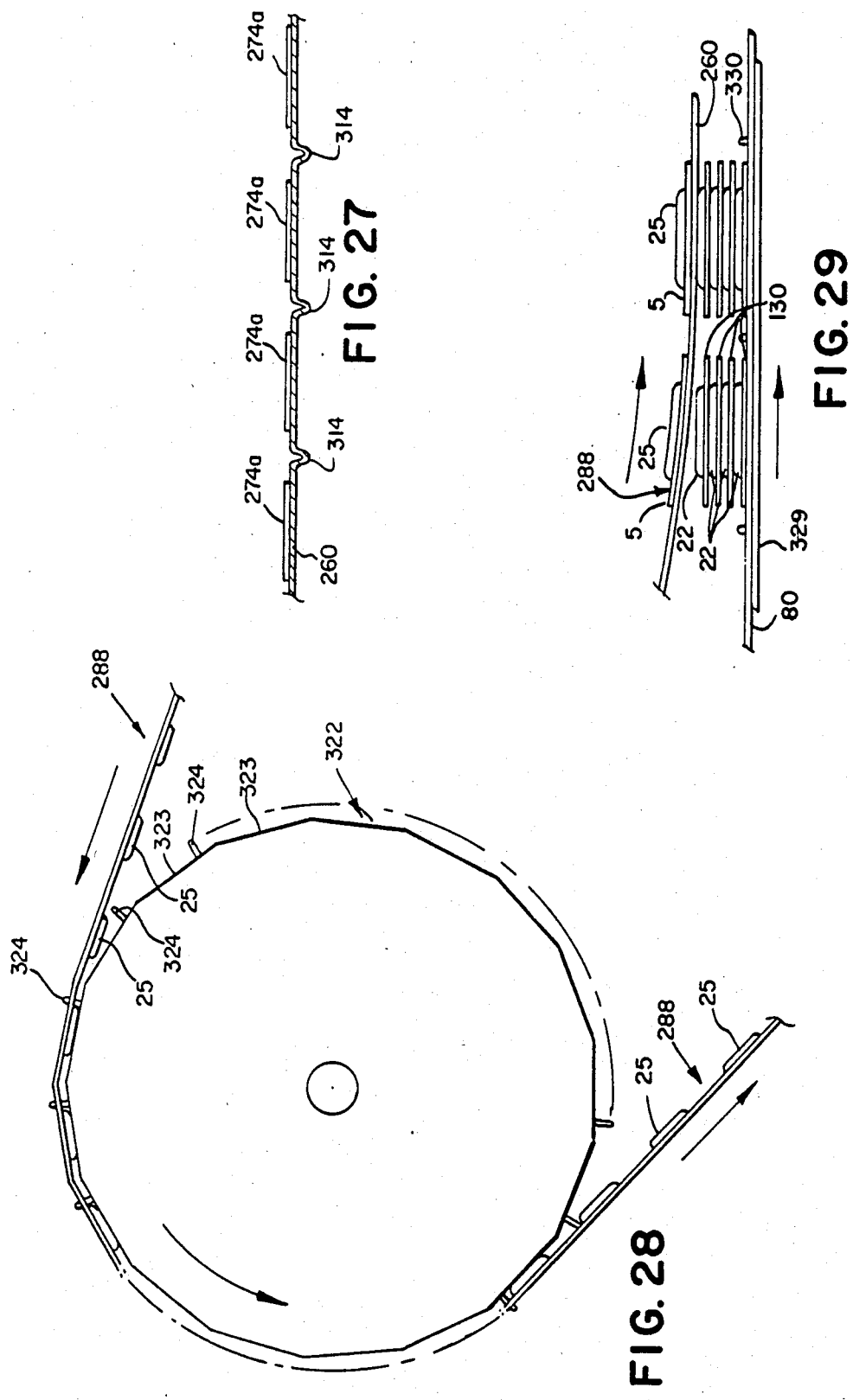

PROCESS FOR MAKING LAMINAR BATTERIES

This is a division of application Ser. No. 295,269, filed Aug. 24, 1981 now U.S. Pat. No. 4,539,275.

This invention relates to electrical cells and batteries, and particularly to novel laminar electrical cells and batteries and methods of making the same.

Batteries of laminar cells have long been known in the art and have been proposed for use in a variety of applications. One early purpose for which such batteries were widely used was as high voltage, relatively high impedance "B" batteries for use in vacuum tube circuits such as radios and the like. For the most part, such high voltage batteries were usually assembled by labor intensive methods which involved the preparation of one complete cell at a time, these cells being stacked to form batteries of the desired voltage.

During the late 1960's and early 1970's, efforts were made to develop a thin flat laminar battery construction for use in the Polaroid SX-70 Land Instant Photography System. The manufacture and sale of such batteries as film pack components became widespread in 1972. Since such batteries were primarily intended as disposable power supplies for exposing and processing a limited number of photographs, extensive efforts were made to simplify their manufacture. Rather than making one cell at a time, the aim was to assemble multiple cell batteries as units, preferably in continuous assembly line fashion.

Early examples of approaches along this line are exemplified by U.S. Pat. Nos. 3,708,349 and 3,775,188. The methods there described generally involve the printing of discrete battery components on continuous webs, which webs were cut into elongated strips and laminated together to form a series of interconnected batteries. As a final step, the interconnected batteries would be cut into individual units.

The basic problem with this approach was that the assembled strips of batteries were generally interconnected by conductive components through which undesired currents could flow, and which are subject to mutual shorting when it was attempted to sever the battery strips into individual units.

Processes in which the problems inherent in severing batteries linked by conductive strips were avoided, ultimately adopted for the widespread production of multiple cell laminar batteries, are exemplified in U.S. Pat. Nos. 4,019,251 and 4,262,825. These processes made use of printed composite webs prepared as contemplated in the earlier processes, but individual conductive battery components were cut from these webs before any attempt was made to assemble them. Battery assembly was carried out using a pair of nonconductive webs, which were severed after assembly of the individual conductive components on one of the webs. These modified processes were successfully employed to make hundreds of millions of batteries and are still in use.

However, the manufacture of laminar batteries as currently practiced involves a relatively large number of steps per assembled battery, including the relatively expensive steps of printing anodes and cathodes in registry on opposite sides of a sheet of conductive plastic, and many steps requiring careful process control, specifically including the printing steps, and the extrusion of eight layers of gel electrolyte per four cell battery. The object of this invention is to facilitate the mass production of multiple cell laminar batteries, and to reduce the number and complexity of the process steps involved.

Briefly, the above and other objects of the invention are attained by a novel laminar battery construction including no printed components and no gel electroyte, and capable of manufacture by a novel process in which, exclusive of external packaging, only four webs need be brought to the final assembly machine, no printing operations are involved, and only one extrusion step per cell is required.

In accordance with a preferred embodiment of the invention, one of the electrodes incorporated in a cell or battery in accordance with the invention is formed as a continuous coating of an aqueous dispersion of active electrode particles in a binder on a conductive plastic sheet, and then dried. Such a coating can be made with a uniformity very difficult to attain with patch printing techniques. A web of the electrode laminate so made can be cut into patches required for the construction of cells with essentially no loss of material.

Preferably, the electrode patches of conductive plastic coated with an active electrode layer are made just slightly larger than cooperating central apertures in thin electrically insulating frames of thermoplastic material, to which the patches are attached by thermally bonding the peripheries of the conductive plastic patches to the frames around the borders of the apertures in the frames. As opposed to prior art constructions in which the conductive plastic laminae extend beyond the boundaries of the electrodes and into the outer seal area between the frames, this construction has the advantages of requiring less conductive plastic per cell, and of ameliorating the problem of effecting a good peripheral seal around the battery by reducing the edge thickness of the assembled battery and by reducing the number of contiguous surfaces which must be sealed together at one time.

In accordance with a preferred embodiment of the invention, the electrode laminates just described are used in combination with a cellophane separator. The separator is inserted between the active side of the coated patch and an opposing electrode in the form of a slurry of active electrode particles in liquid electrolyte.

The cellophane separator has been found particularly effective in a LeClanche type electrochemical system for high drain rate applications, but has a proneness to curling and wrinkling when wet that must be taken into account to avoid drastic increases in internal impedance. An effective expedient for mitigating the consequences of cellophane wrinkling in constructions in which the separator confronts an immobilized particulate electrode is the use of a layer of gel electrolyte between the separator and the electrode, as disclosed in U.S. Pat. No. 4,119,770. However, the gel electrolyte layer requires an additional process step and adds thickness to the battery. Other constructions not requiring the use of gel electrolyte that have been proposed either require prelamination of the separator over the entire face of the immobilized electrode, as in U.S. Pat. Nos. 4,125,685 and 4,161,815, or no preattachment of the separator to any other battery component during assembly, as described in U.S. Pat. No. 4,125,684.

The construction proposed in U.S. Pat. No. 4,125,685 minimizes material requirements by utilizing a triplex structure in which conductive plastic, an immobilized electrode particle layer, and a cellophane layer are formed as an integral laminate with coterminous borders. This structure, while efficient, affords opportunities for interelectrode shorts that are avoided in the construction described in U.S. Pat. No. 4,161,815, at the cost of the use of additional conductive plastic. In accordance with the latter patent, a layer is laminated over a dry patch electrode smaller than the separator and printed on a central region of a conductive plastic substrate. The structure proposed in U.S. Pat. No. 4,235,684, in which no preattachment of the separator is permitted, both requires a printed patch electrode and the handling of loose individual pieces of cellophane.

In accordance with the invention in a presently preferred embodiment, the separator extends beyond the borders of the conductive plastic-electrode laminate, and is preattached to the frame in discontinuous regions beyond the borders of the electrode laminate, preferably by spaced parallel strips of adhesive. It has been found that when the batteries made in this way are sealed under vacuum, no appreciable increases in impedance are encountered, even though the cellophane becomes wrinkled and no gel electrolyte is employed. Moreover, these parallel stripes of adhesive are readily applied to a cellophane web prior to battery assembly in the course of battery manufacture in accordance with the invention, and require only an appropriate degree of web edge position control to effect proper registration of the separator in the cell.

Problems encountered in cutting through conductive webs in assembled or partially assembled batteries, previously resolved by cutting the conductive components into individual pieces for pick and place assembly, are avoided in accordance with the invention by the construction of three, and preferably four, nonconductive webs that are used to convey conductive components to and through the process of battery assembly. The first of these is a monolithic web of nonconductive, dimensionally stable material coated on one side with an adhesive and perforated in a manner to be described below to facilitate registration with other webs during assembly, and for other purposes to be described. This web is used in a manner analogous to conventional processes in that it serves as the main carrier web to convey other components through the battery assembly process.

A second web utilized in the battery assembly process in accordance with the invention comprises a composite framed electrode/separator web based on a sheet of nonconductive thermoplastic material perforated with a rectangular array of rows and columns of apertures. The apertures may be of any desired shape, but are preferably generally rectangular for most efficient utilization of other materials. Patches of the electrode laminate referred to above are laminated over the apertures in the nonconductive web in a continuous cut and place operation during which individual pieces of the laminate are only very briefly present as they are detached from an electrode laminate web and transferred directly to the nonconductive web while held in place on a vacuum transfer anvil roll. Pieces of an adhesive-striped separator web are then cut and continuously transferred to the framed electrode web so formed in another continuous cut and place operation during which the individual pieces of cellophane are held firmly on a vacuum transfer roll during their transfer from the mother web to the composite web. During battery assembly, this composite framed electrode/separator web is utilized in a manner that is particularly efficient for the construction of a plurality of batteries in parallel, by cutting strips across the direction of elongation of the composite web between adjacent rows of separators and transferring the strips to previously attached component strips on the main carrier web in another cut and place operation during which the strips of composite web are under full control during their brief transfer from web to web.

The third web utilized in the practice of the invention is a composite web made from the second composite web by laminating spaced parallel strips of metal to the nonconductive substrate of the second web on the side opposite the electrode laminates, in columns aligned with the direction of elongation of the second web. This third web is transferred stripwise to the main carrier web in another cut and place operation during which cuts across the direction of movement of the third web sever a plurality of metal strips at each cut at a stage of manufacture before any conductive components are superposed in the path of the cutting knife roll.

A fourth web employed in the practice of the invention in its presently preferred embodiment comprises a nonconductive dimensionally stable substrate on which are laminated a rectangular array of spaced rows and columns of electrode terminal blanks, preferably comprising laminates of metal and conductive plastic. Index perforations are formed in these blanks, and they are subsequently pocketed in dies which form central cavities in the blanks to receive other cell components and thereby reduce the edge thickness of the assembled batteries. Prior to pocketing, the insulating web to which the blanks are attached is preferably creased between columns of the blanks, to allow for movements caused by dimensional changes in the blanks during processing. Following the pocketing operation, the fourth web is laminated to the main carrier web in a continuous operation during which precise registration of each pocketed terminal with other components on the main carrier web is attained by synchronizing the movement of the terminals with the movement of the main carrier web, using the indexing perforations formed in the main carrier web in conjunction with the index perforations in the pocketed terminals.

Following the joining of the main end terminal carrier webs in the manner just described, the webs are preferably severed into strips each containing a plurality of rows and columns of assembled batteries, and these strips are conveyed to a vacuum sealing unit for a single stage sealing operation. This practice has the advantages over the multiple strike sealing process employed in the conventional process that fewer controlled operations are involved, and that mechanical damage that might occur during the forceful hot and cold strike sealing operations conventionally employed is avoided.

The invention will best be understood in the light of the following description, together with the accompanying drawings, of cells and batteries in accordance with the invention and methods of making the same.

In the drawings,

FIG. 1 is a schematic three-quarter perspective sketch of a completed battery in accordance with the invention;

FIG. 2 is a cross-sectional schematic elevational view, with vertical dimensions exagerated with respect to horizontal dimensions and on an enlarged scale, of a cross-section through the battery of FIG. 1 as seen substantially along the lines 2—2 in FIG. 1;

Figure 3:
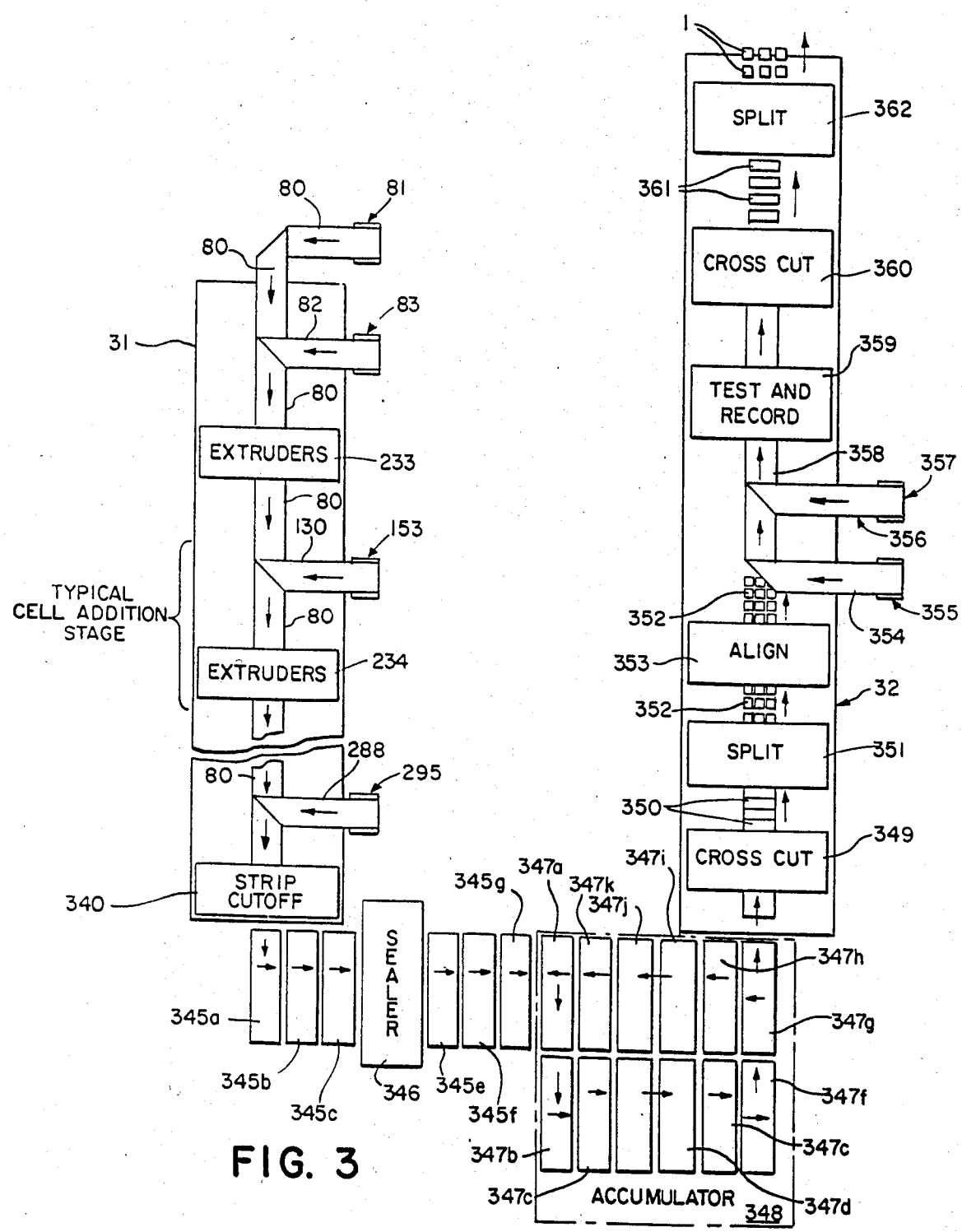
FIG. 3 is a schematic plan view comprising a process block and flow diagram illustrative of the process of making cells and batteries in accordance with the invention.
Figure 19:
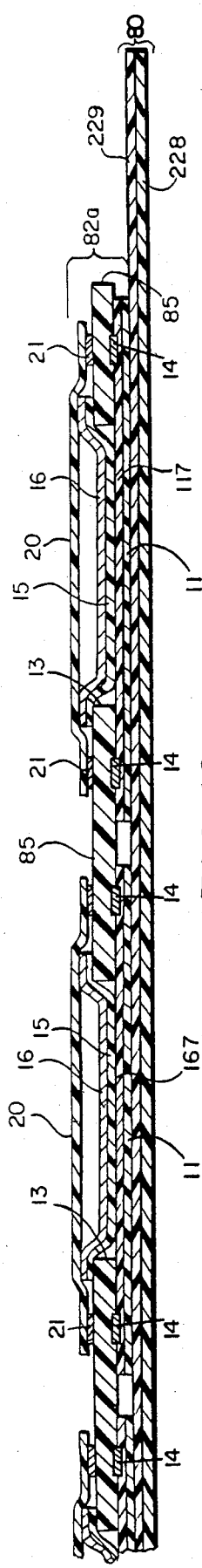
Figure 5B:
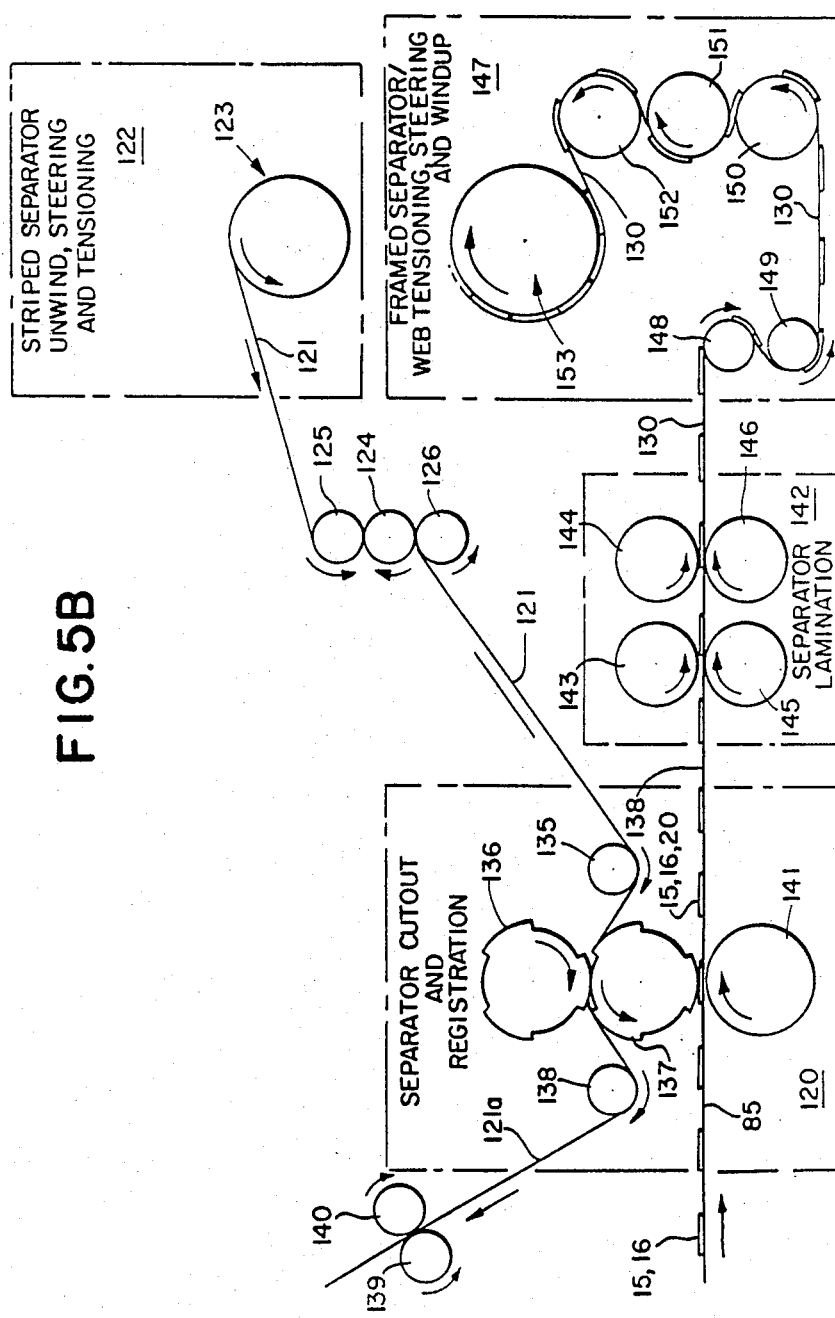
Figure 10:
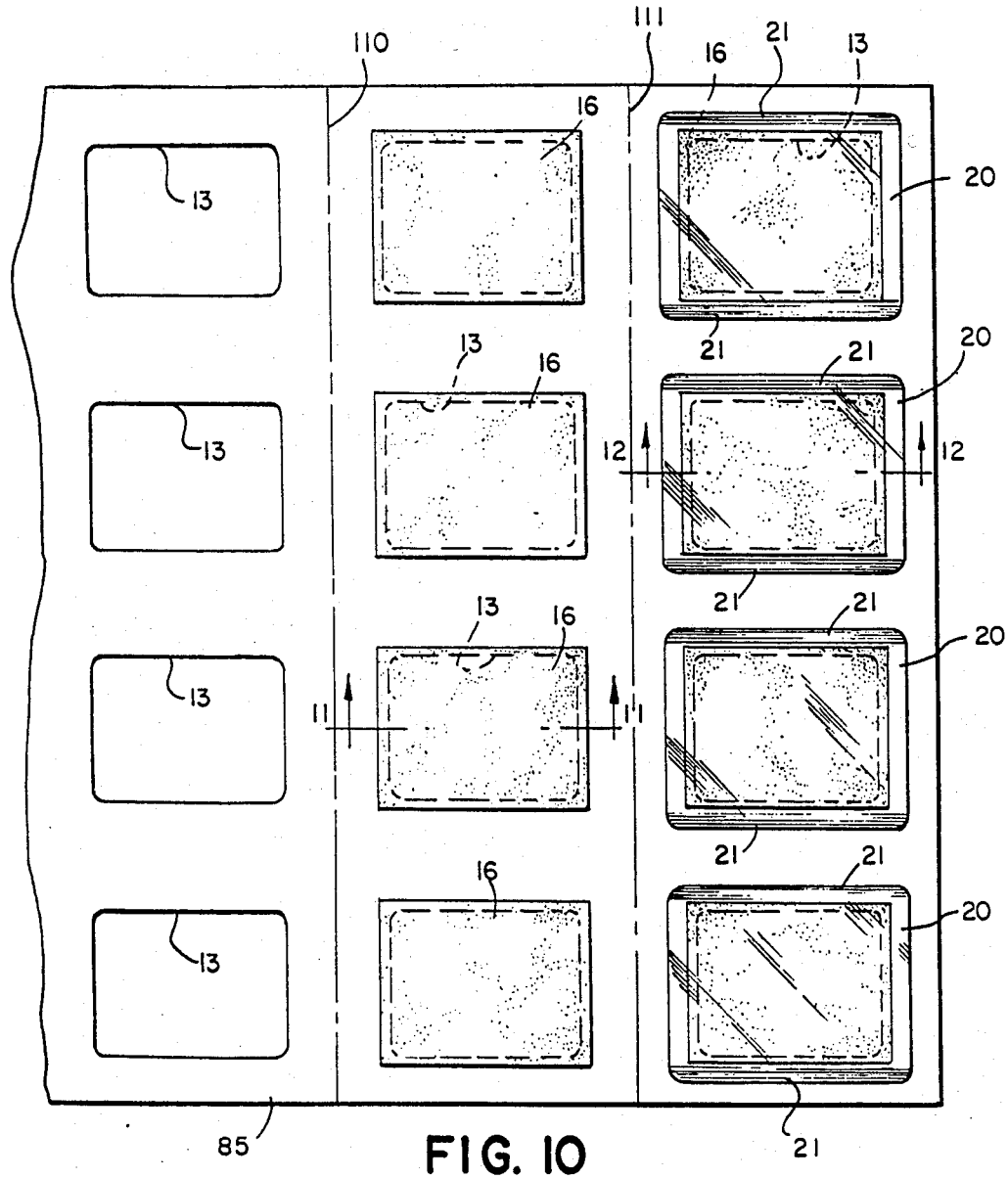
Figure 11:
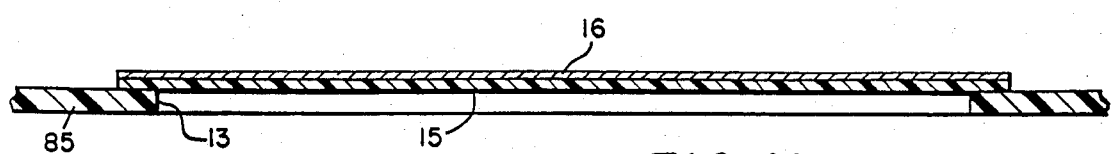
Figure 12:
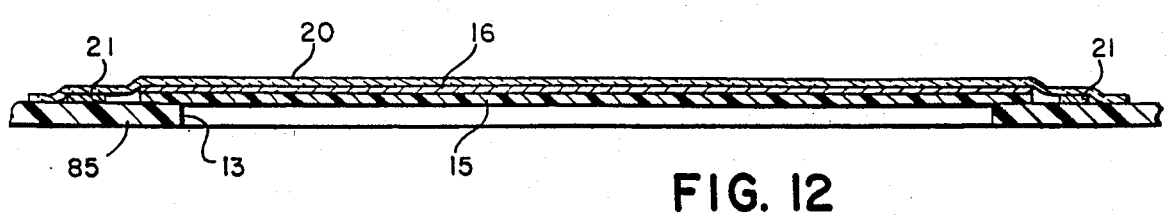
Figure 16:
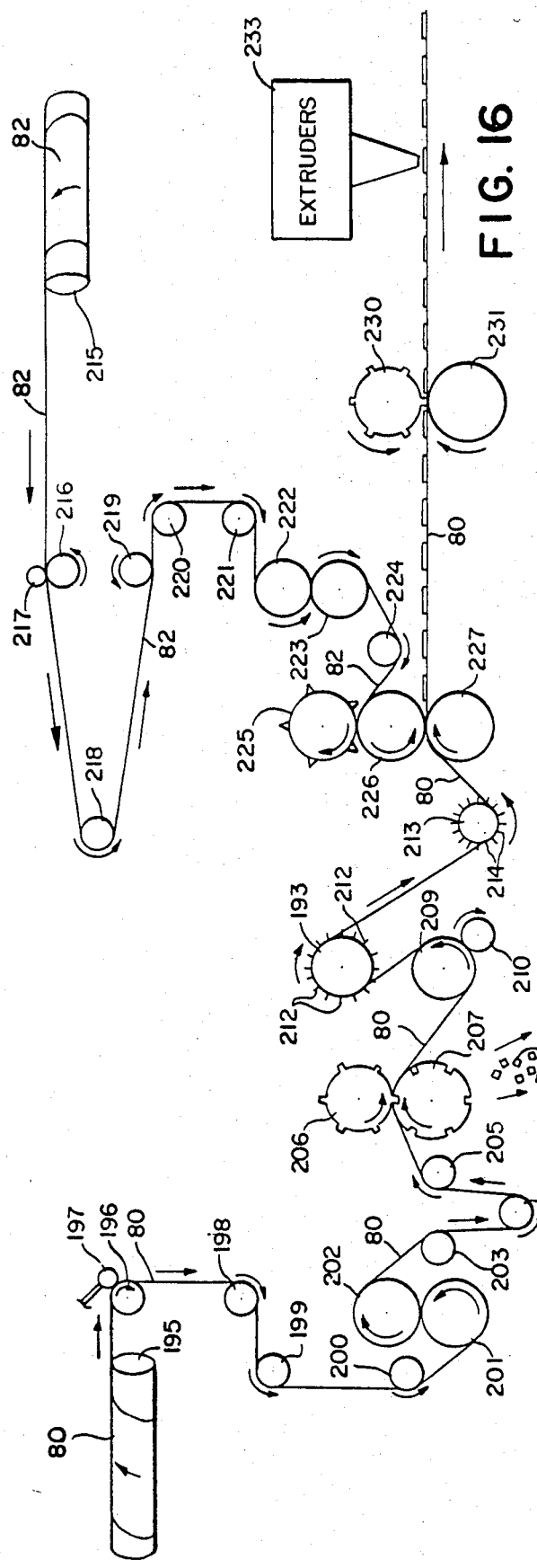
Figure 20:
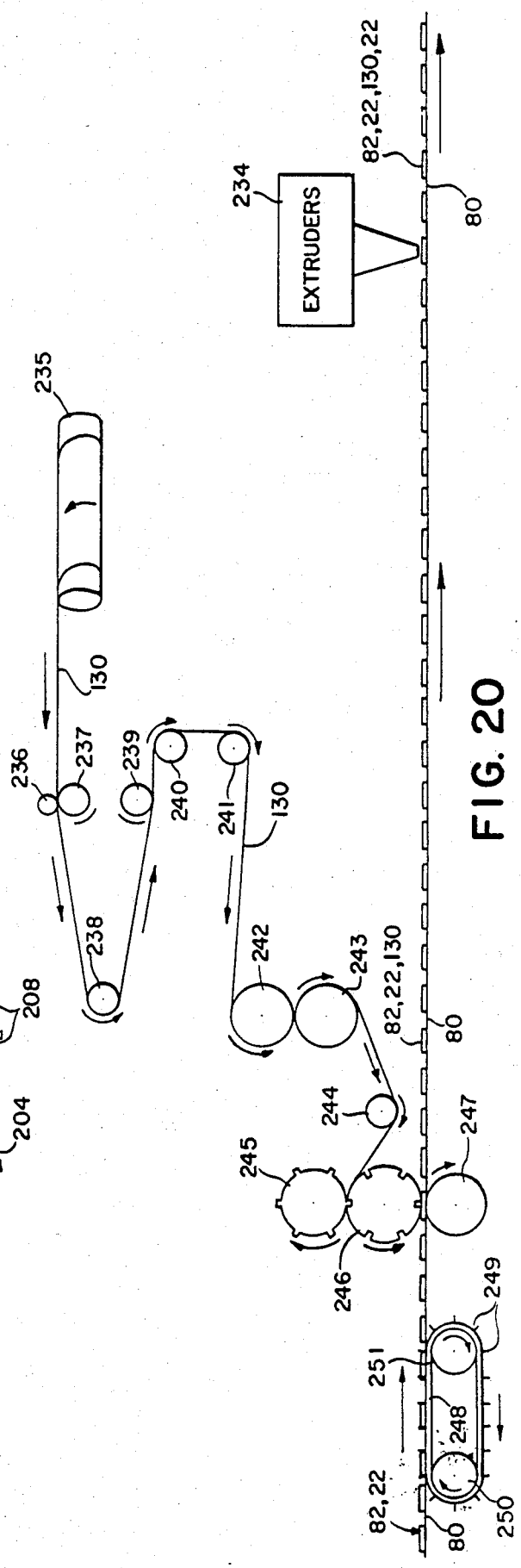
Figure 17:
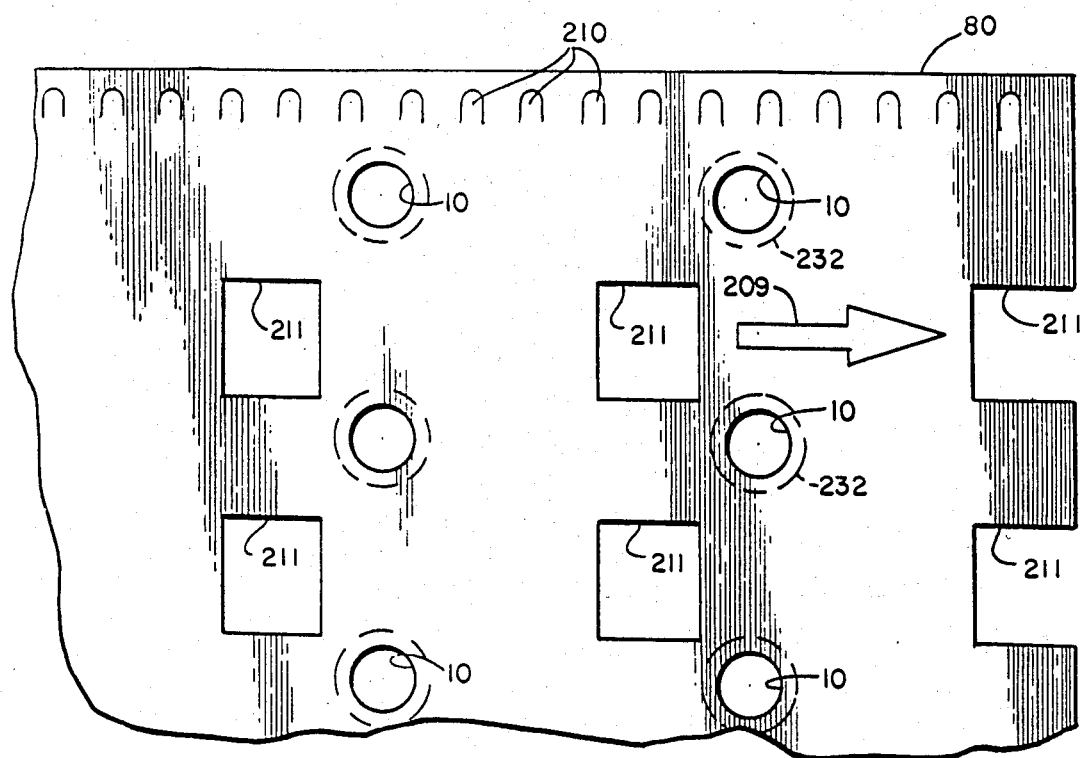
Figure 18:
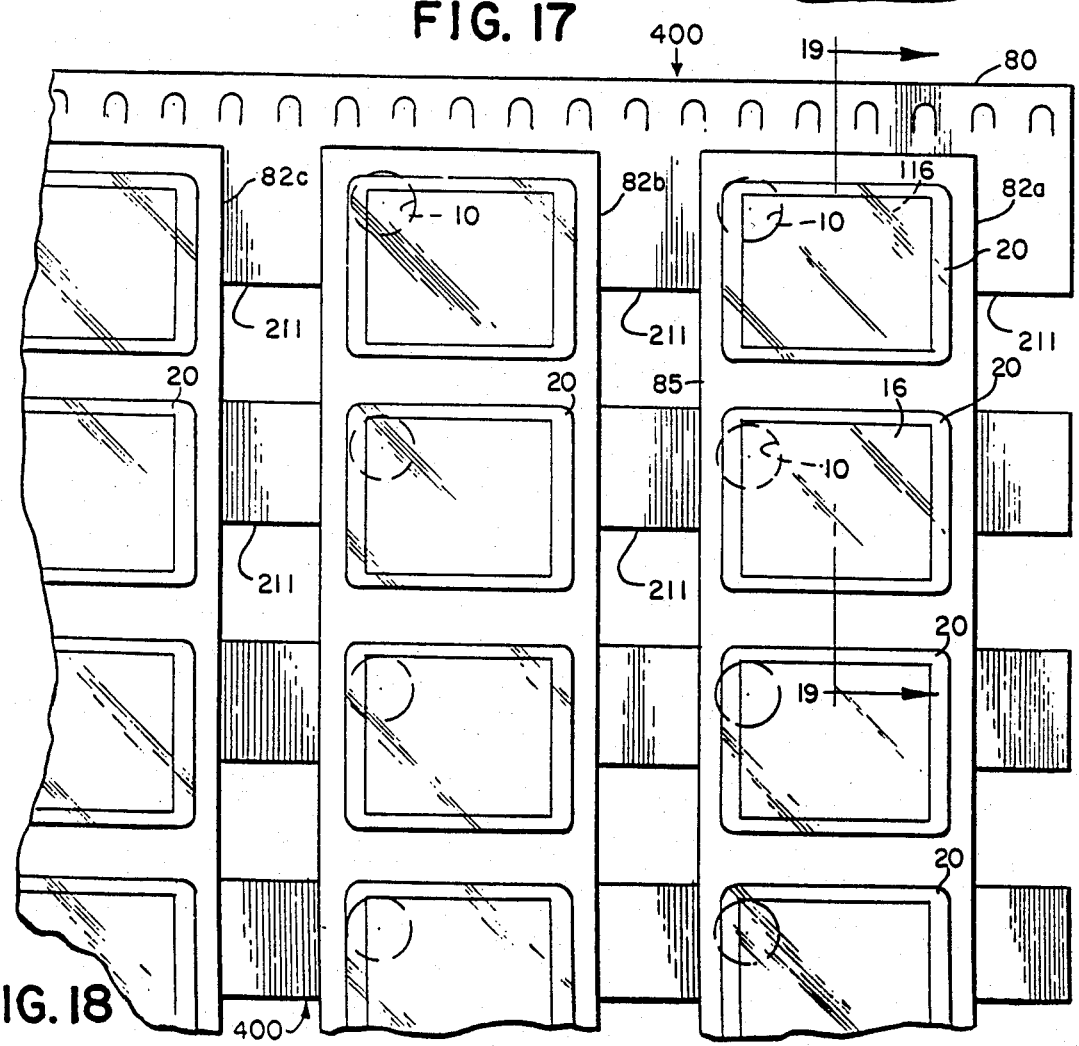
Figures 21, 22, 23:
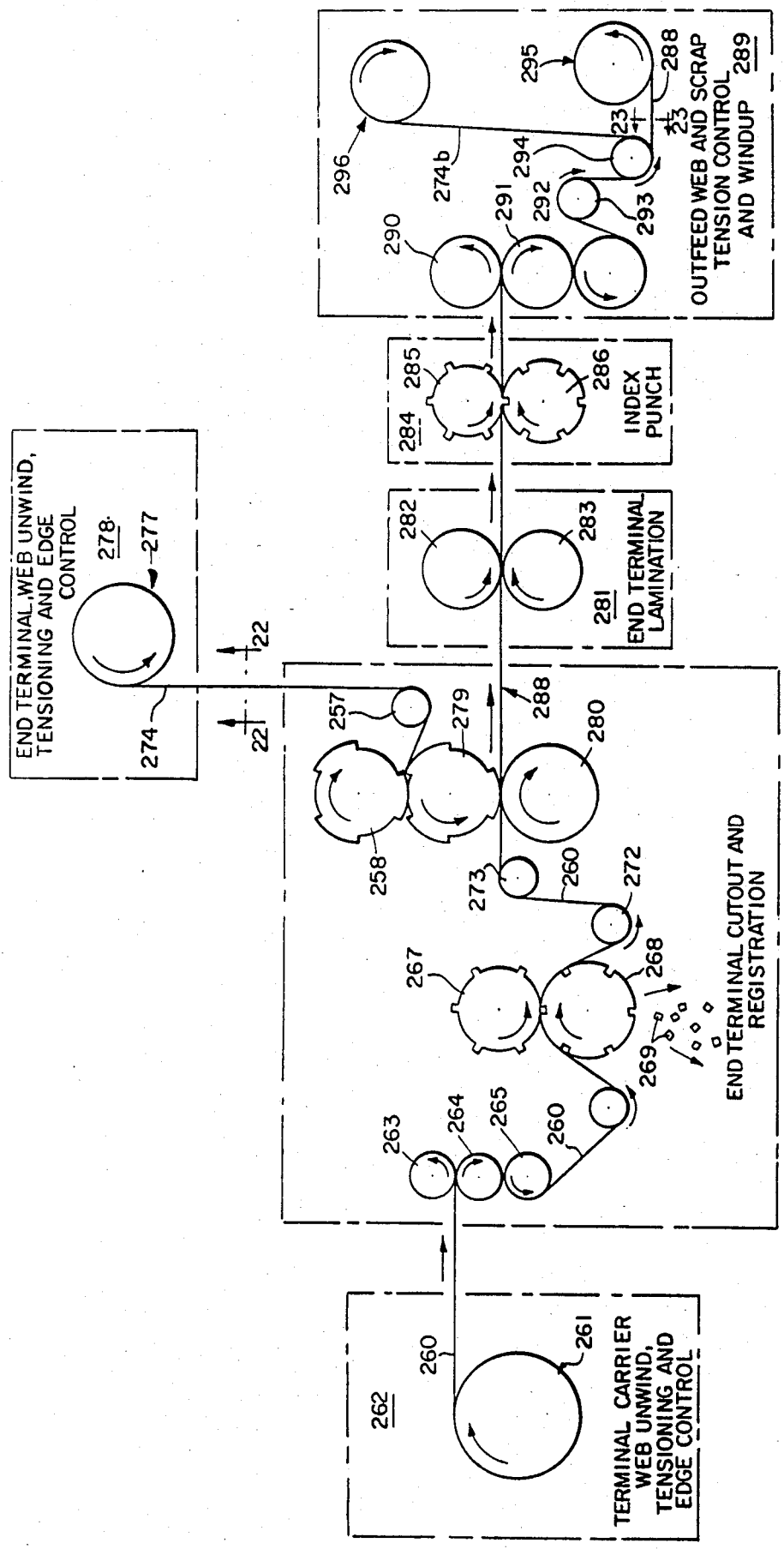
Figure 24:
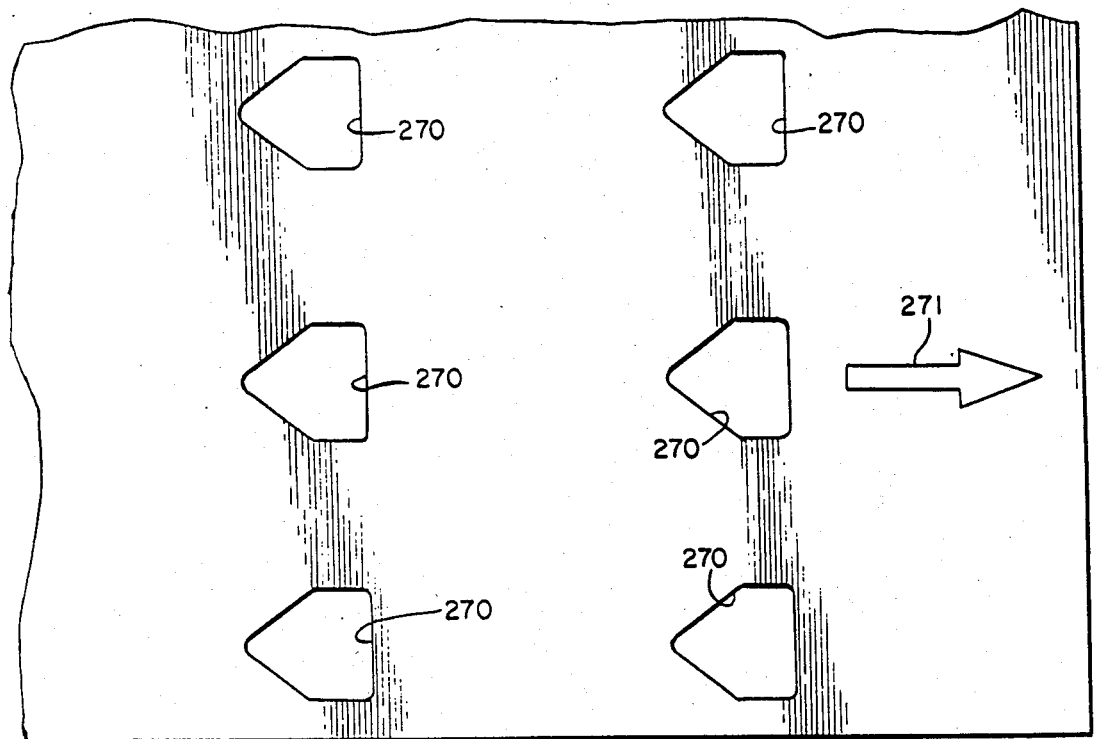
Figure 25:
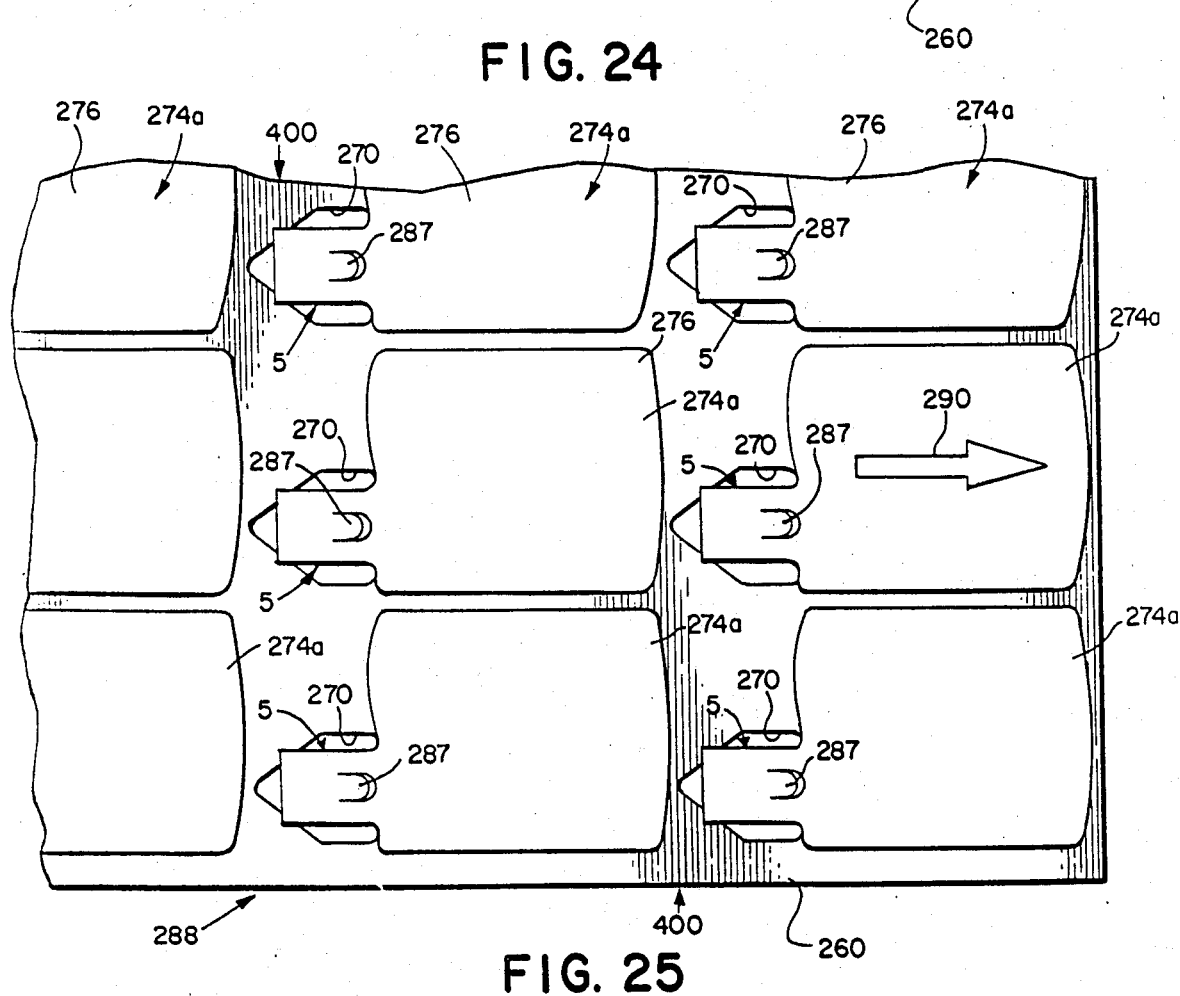
Figure 26:
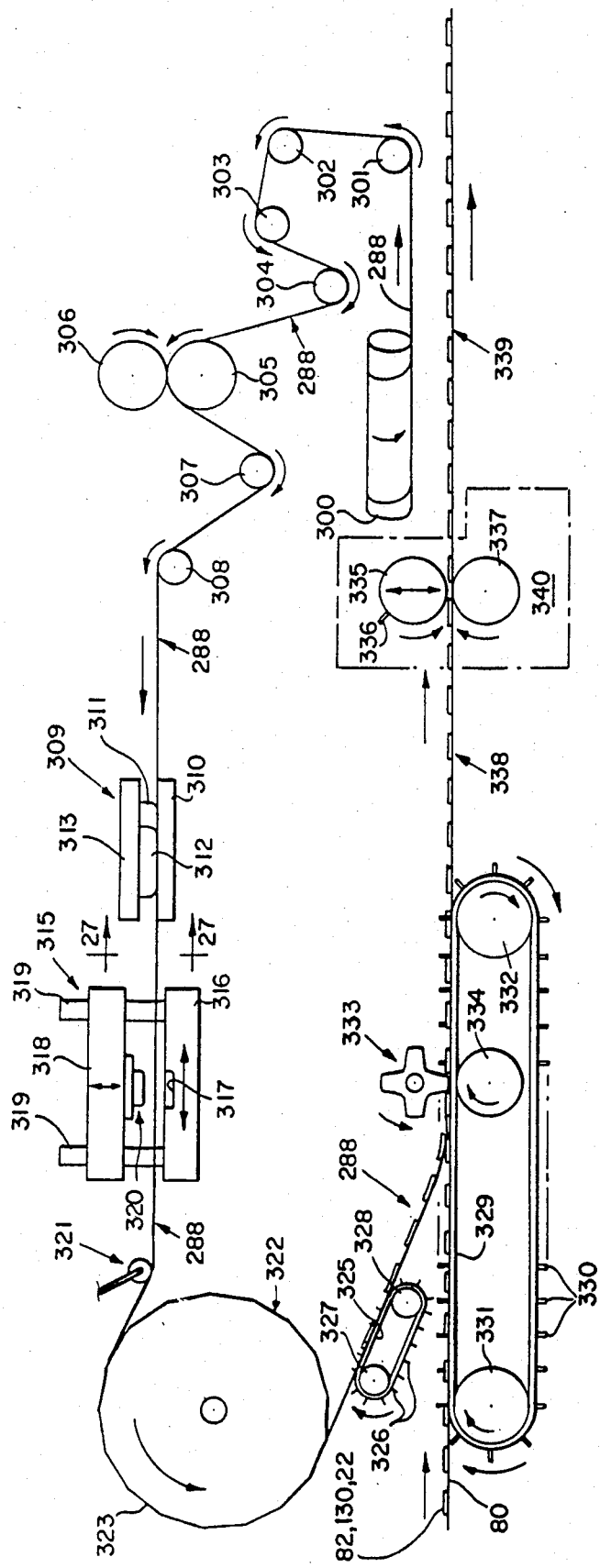

FIGS. 5A and 5B, when arranged horizontally side by side with FIG. 5A at the left, comprise a schematic elevational flow diagram illustrative of the process of preparing a framed electrode/separator web in accordance with the invention and useful in the practice of the process illustrated in FIG. 3;

FIG. 6 is a diagrammatic elevational cross-sectional sketch, on an enlarged scale, of a portion of a web used in the process of FIGS. 5A and 5B, as seen substantially along the lines 6—6 in FIG. 5A;

FIG. 7 is a schematic elevational cross-sectional sketch of slit portions of the web of FIGS. 5A and 6 as seen essentially along the lines 7—7 in FIG. 5A;

FIG. 8 is a schematic diagrammatic elevational cross-sectional sketch of a portion of a perforated web formed as illustrated in FIG. 5A, as seen substantially along the lines 8—8 in FIG. 5A;

FIG. 9 is a schematic elevational cross-sectional sketch of a composite web manufactured in accordance with the process illustrated in FIGS. 5A and 5B, as seen substantially along the lines 9—9 in FIG. 5A;

FIG. 10 is a schematic elevational plan sketch of a web formed in accordance with the process illustrated in FIGS. 5A and 5B, showing the web in various stages of manufacture;

FIG. 11 is a schematic elevational cross-sectional sketch, on an enlarged scale, of a portion of the web during manufacture in accordance with the process illustrated in FIG. 5A as seen substantially along the lines 11—11 in FIG. 10;

FIG. 12 is a schematic elevational cross-sectional sketch, on an enlarged scale, showing a portion of the web manufactured in accordance with the process illustrated in FIGS. 5A and 5B at a later stage of manufacture, as seen essentially along the lines 12—12 in FIG. 10;

FIG. 13 is a diagrammatic elevational sketch illustrating a process of preparing a composite end terminal/half cell web useful in the process of manufacturing batteries illustrated in FIG. 3;

FIG. 14 is a diagrammatic schematic cross-sectional sketch, on an enlarged scale, illustrating a portion of a primed metal foil web slit in preparation for lamination in the process of FIG. 14, as seen substantially along the lines 14—14 in FIG. 13;

FIG. 15 is a schematic elevational cross-sectional sketch illustrating a portion of the web prepared in accordance with the process of FIG. 15 as seen substantially along the lines 15—15 in FIG. 13;

FIG. 16 is a schematic elevational sketch illustrating a process for applying a composite end terminal/half-cell web to a main carrier web at an initial stage of the process illustrated in FIG. 3;

FIG. 17 is a diagrammatic schematic fragmentary plan sketch, on an enlarged scale, of a portion of the carrier web prepared in accordance with the process of FIG. 16;

FIG. 18 is a fragmentary elevational schematic plan sketch similar to FIG. 17 and illustrating a portion of the web formed in accordance the process of FIG. 16 following the addition of pieces of composite end terminal and half-cell subassembly web to the carrier web of FIGS. 16 and 17;

FIG. 19 is a fragmentary elevational cross-sectional sketch through a portion of the web of FIG. 18, as seen substantially along the lines 19—19 in FIG. 18 and on an enlarged scale;

FIG. 20 is a schematic elevational sketch illustrating the process of adding typical sections of composite framed electrode/separator web to a partially completed web prepared in accordance with the process of FIG. 3, and the subsequent extrusion of cathodes onto the web;

FIG. 21 is a schematic elevational sketch illustrating the process of laminating end terminals to a terminal carrier web for use in the process of FIG. 3;

FIG. 22 is a diagrammatic elevational cross-sectional sketch, on an enlarged scale, illustrating a section of web used in the process of FIG. 21 as seen essentially along the lines 22—22 in FIG. 21;

FIG. 23 is a schematic elevational diagrammatic cross-sectional view, on an enlarged scale, illustrating a portion of the completed web manufactured in accordance with the process of 21, as seen essentially along the lines 23—23 in FIG. 21;

FIG. 24 is a fragmentary schematic plan sketch, on an enlarged scale, illustrating a portion of the terminal carrier web prepared in accordance with the process of FIG. 21;

FIG. 25 is a schematic fragmentary plan sketch, on an enlarged scale, illustrating a portion of the finished end terminal carrier web prepared in accordance with the process illustrated in FIG. 21;

FIG. 26 is a schematic elevational sketch illustrating a process of adding an end terminal web to a composite web containing battery components prepared in accordance with one stage in the process of FIG. 3, and illustrating the cutting off of strips of completed batteries;

FIG. 27 is a fragmentary cross-sectional elevational sketch, on an enlarged scale, illustrating a web employed in the process of FIG. 26 following a creasing operation, as seen essentially along the lines 27—27 in FIG. 26;

FIG. 28 is a diagrammatic fragmentary elevational sketch, on an enlarged scale, with parts omitted and parts shown broken away, illustrating a gripper roll used in the process of FIG. 26 in more detail; and FIG. 29 is a diagrammatic elevational sketch, with parts broken away and parts omitted, illustrating the addition of an end terminal web to a web carrying assembled battery components at one stage in the process of FIG. 26.

FIG. 1 shows a completed laminar battery which, in accordance with the invention, may be generally similar in its external appearance to the familiar thin flat battery packaged with a Polaroid SX-70 Land film pack, except that for the same number of cells and a similar electrical capacity, it will generally be of somewhat smaller major dimensions and somewhat greater in thickness than the conventional battery. In its external aspects, the battery 1 comprises a card 2 of construction paper, cardboard or the like, which may be pigmented on one or both sides and printed with chosen indicia in any desired manner, that serves as the base of the completed battery and is preferably dimensioned to be accepted in the desired power supply recepticle for which the battery is intended, such as a film pack, cassette recorder, calculator, camera or the like.

The card 2 is laminated in selected regions to a battery comprising a set of components 3 to be described in more detail below, over which there is adhered a pocketed terminal sheet 4 of conductive material which is preferably formed with a tab 5 wrapped around the other components 3 of the battery to present an active terminal on the opposite side in a manner generally familiar to those skilled in the art.

An overwrap layer 6 is preferably laminated to the card 2 over the active components of the battery as illustrated in FIGS. 1 and 2. The overlap layer 6 may be of any suitable inert, chemically stable material, and serves primarily to prevent mechanical interference with underlying components during manipulation of the battery. Polyethylene has been successfully employed for this purpose, although it has a tendency to shrink during heat-sealing that may cause other more dimensionally stable materials such as paper, glassine or various commercially available paper-foil laminates to be prefered.

While the battery 1 may comprise one or any desired number of cells, for purposes of convenience and to illustrate a preferred embodiment for many applications, a four cell battery will be described.

While batteries in accordance with the invention, and made by the process of the invention to be described, may be of any desired electrochemical system, selected in a manner which will be apparent to those skilled in the art from available systems which utilize components compatible with the methods of assembly to be described, for purposes of illustration and in accordance with an embodiment presently of principle interest, the battery will be described as being of the LeClanche type, utilizing zinc anodes, manganese dioxide cathodes, and an electrolyte of ammonium chloride and zinc chloride, to which a small amount of mercuric chloride is preferably added.

Referring to FIG. 2, the card 2 is provided with a pair of perforations 7 and 8 through which the positive and negative terminals of the battery are accessible. It will be apparent to those skilled in the art as the description proceeds that the battery to be described could be assembled with an anode adjacent the card 2 and a cathode as the most remote electrode, or vice versa, but in accordance with a particularly preferred embodiment to be described and to take maximum advantage of the process of assembly of the invention, the battery will be described as built up from anode to cathode, such that the negative terminal of the battery will be exposed through the aperture 7 on the card 2, and the positive terminal of the battery exposed through the aperture 8.

Referring to FIG. 2, on the card 2 is mounted an insulating base sheet 9 of kraft paper or the like, or most preferably of the material more fully shown and described in U.S. Pat. No. 4,086,400, the latter comprising a laminate of kraft paper, a thermoplastic liquid-impervious resin overlying the paper, and an overlayer on the resin of a heat sealing adhesive. The adhesive layer would be on the top side as seen in FIG. 2. The kraft paper side of the insulating sheet 9 may be selectively laminated to the card 2 by means of one or more stripes of any suitable adhesive, such as poly(ethylene/vinyl acetate), not shown.

As shown in FIG. 2, the insulating sheet 9 is provided with an aperture 10 in registry with the aperture 7 in the card 2 to expose what, in this case, is the negative terminal of the battery comprising a sheet 11 of metal, preferably a sheet of aluminum foil, for example, of 2 mils in thickness.

As will appear, the metal terminal sheet 11 is laminated to a selected region surrounding the aperture 10 in the insulating sheet 9, and to the peripheral borders of the sheet 9, but is not necessarily, and preferably is not, laminated to the insulating sheet in other regions.

The upper side of the metal terminal sheet 11 is preferably coated with a thin layer of conductive priming adhesive, not shown in FIG. 2, typically from 0.1 to 0.8 mils in thickness, and to this conductive adhesive surface is adhered an insulating frame 12a. The frame 12a is formed with a central aperture 13 which serves to receive other electrochemically active components in a manner to be described.

During the lamination of the frame 12a to the metal terminal sheet 11, one or preferably two vent strips 14 are preferably laminated between the frame 12a and the conductive plastic adhesive coated upper surface of the metal terminal sheet 11. The vent strips 14 may be made of paper or the like, which may be embedded in a thermoplastic resin prior to lamination into the structure shown, but are preferably simply laminated into the thermoplastic matrix comprising the frame 12a and the thin layer of conductive primer overlying the metal terminal sheet 11. These vent strips 14 serve to allow the egress of hydrogen formed during the life of the battery, and, together with the surrounding thermoplastic matrix, prevent the loss of appreciable amounts of water or the ingress of oxygen in a manner more fully illustrated and described in U.S. Pat. Nos. 4,105,831; 4,254,191; and 4,256,813, for example.

For convenience in the illustration of the several features of the battery 1 in a single view, the vent strips 14 are shown in FIG. 2 at 90 degrees to their preferred orientation relative to the tab 5. As will appear, in accordance with the preferred embodiment of the invention, the strips 14 and the tab 5 are both aligned in the machine direction during battery assembly. However, the arrangement shown is equally efficacious in the completed battery.

An anode electrode structure comprising a sheet 15 of conductive plastic over which is coated a layer 16 of active anode material is located principally within the aperture 13 formed in the frame 12a and has external borders extending around and over the aperture 13, with the conductive plastic sheet 15 being laminated to the edges of the frame 12a around the borders of the aperture 13 and the conductive plastic sheet 15 being laminated to the conductive primer side of the conductive metal end terminal sheet 11 as shown in FIG. 2.

The conductive plastic sheet 15 may be made of any conventional material; for example, of Condulon conductive plastic as made and sold by Pervel Industries, Inc. of Plainfield, Conn. The coated anode particle layer 16 may be made of an aqueous composition comprising zinc powder and a little carbon black together with a binder, coated on the conductive plastic sheet and dried, in a manner described more fully, for example, in U.S. Pat. No. 4,119,770 in column 8, lines 40–63. Rather than being patch printed on the conductive plastic, the conductive zinc particle layer is preferably continuously coated on a conductive plastic web and later cut into patches of the kind shown at 15 and 16 in FIG. 2 in a manner to be described in more detail below.

A presently preferred zinc anode coating composition, in percent by weight based on the weight of composition, is as follows:

| Component | Weight Percent |
|---|---|
| Zinc Powder | 75.78 |
| H$_2$O | 19.25 |
| TSPP | 0.056 |
| Calgon 261 | 0.23 |
| Bentone LT | 0.14 |
| Polytex 6510 | 4.16 |
| Carbon Black | 0.38 |
| | 100.0 |

In the above composition, TSPP is tetrasodium pyrophosphate; Calgon 261 LVF is a low molecular weight poly (diallyl dimethyl ammonium chloride) as made and sold by Calgon Corporation of Pittsburgh, Pa.; Bentone LT is an organic derivative of hydrous magnesium aluminum silicate, made and sold by National Lead Co., Inc. of N.Y., N.Y.; and Polytex 6510 is an acrylic emulsion resin made and sold by Celanese Cor. of Newark, N.J. The quantities of Polytex 6510 and Calgon 261 LVF are as solids, excluding water. This composition is uniformly coated on the conductive plastic substrate and dried.

Overlying the anode layer 16 in FIG. 2 is a separator 20 of any conventional material, but preferably of cellophane approximately 1.3 mils in thickness and free of humectants and plasticizers. A fuller description of the properties of cellophane as a separator in an electrochemical system of the type here specifically described by way of illustration appears in above cited U.S. Pat. No. 4,119,770.

For reasons to be described more fully below, the separator 20 is not fully attached along its periphery to the frame 12a, but is only selectively adhered thereto by means of stripes of adhesive 21 on either side of the separator along two sides thereof. The adhesive stripes 21 may be of any selected adhesive material, and for example, of poly(ethylene/vinyl acetate), a polyamide, or the like.

The components just described, comprising the insulating sheet 9, the metal terminal sheet 11, the frame 12, the conductive plastic layer 15 and its coating 16 of active anode particles, and the separator 20, are preferably formed in a manner to be described in more detail below as a part of a single composite web which acts as an integral subassembly in the process of manufacturing batteries in accordance with the invention. Overlying the separator 20 in this structure, as seen in FIG. 2, is a cathode 22 of any conventional composition, preferably formed in the specifically preferred embodiment to be described as a slurry of manganese dioxide and carbon particles in an aqueous electrolyte containing zinc chloride, ammonium chloride and a small amount of mercuric chloride in the initial assembly of the battery. As will be apparent to those skilled in the art, the mercury constituent of the mercuric chloride readily amalgamates with the zinc layer 16 after assembly of the battery and will not be present in the cathode slurry very long after the assembly of the battery. The cathode slurry 22 may be of any desired conventional composition, for example, those described in U.S. Pat. No. 4,119,770. In accordance with a presently preferred embodiment of the invention, a cathode slurry mix of the following composition is preferred:

| Component | Weight Percent |
|---|---|
| MnO$_2$ | 40 |
| Carbon Black | 8 |
| ZnCl$_2$ | 12.9 |
| NH$_4$Cl | 1.0 |
| HgCl$_2$ | .5 |
| H$_2$O | 37.6 |
| | 100 |

The above composition and its properties are more fully described in copending U.S. application Ser. No. 295,267, filed on Aug. 24, 1981 by Pierre E. Nel and Joanne C. Pleskowitz for Laminar Electrical Cells and Batteries and assigned to the assignee of this invention, now U.S. Pat. No. 4,361,633.

If a single cell battery is to be constructed, its next layer would be a composite end terminal 4, in which, for that purpose, it would not be necessary to provide a pocket for most purposes. However, for a multiple cell battery of the type shown in FIG. 2, the next layer over the cathode 22 would comprise another electrode assembly consisting of an electrochemically isolating layer of conductive plastic 15 identical to the lowermost layer 15 described above, on which there is coated on a layer of active anode particles 16 as described previously.

As described above, the second conductive plastic layer 15 is laminated around its edges to a second frame 12b indentical to the frame 12a for the lower cell just described. Following assembly of the battery in the form shown in FIG. 2, the layer 15 is in intimate contact with the first cathode layer 22.

As will appear, the group of components comprising the second frame 12b, with its intercell connector and electrode assembly comprising conductive plastic layer 15 and overlying active anode layer 16, together with another separator 20 adhered in place to the frame 12b by adhesive stripes 21, may be cut from a single composite web that serves as an integral subassembly in the process of manufacturing batteries in accordance with the invention and to be described in more detail below.

Over the separator 20 attached to the frame 12b as just described is applied another cathode layer 22 of the same composition as the first described above. The assembly just described could be terminated as a two cell battery by adding the terminal assembly 4 as described above. However, in the specific embodiment shown in FIG. 2, a four cell battery is made by adding two more subassemblies comprising frames 12c and 12d, each formed integral with a conductive plastic sheet 15 over which a conductive layer 16 of zinc particles is applied, and over which zinc layer a separator 20 is partly adhered to adjacent portions of the frame by means of adhesive stripes 21.

A cathode layer 22 is deposited on top of each of the structures so described. The uppermost cathode is then covered by the terminal structure 4.

As shown in FIG. 2, the terminal structure 4 comprises a sheet of conductive plastic 23, of Condulon or the like, for example, of 2 mils in thickness, laminated to a cathode end terminal sheet 24 of metal, preferably of aluminum foil 2 mils in thickness and primed on the side adjacent the conductive plastic layer 23 with a thin coat of conductive plastic adhesive employed for the purpose of adhering the conductive plastic sheet 23 to the metal terminal 24 in a manner known in the art per se.

As mentioned above, the end terminal assembly 4 is preferably formed with a pocket comprising a central raised portion 25 as shown in FIGS. 1 and 2. Preferably, the pocketed terminal assembly 4 comprises a sheet of glassine paper 30 adhered to the metal terminal sheet 24 except over the portion comprising the tab 5. The glassine sheet 30 serves as an insulating layer in a manner more fully described in U.S. Pat. No. 4,019,251. The glassine sheet serves in the process of the invention to be described to perform the further function of lubricating the die used to form the pocket 25, as will be described in more detail below.

While the battery just described in connection with FIGS. 1 and 2 could be assembled by any of the techniques known to those skilled in the art for the assembly of laminar batteries, in accordance with the invention in its preferred embodiment it is assembled by the process next to be described with reference first to FIG. 3.

As shown in FIG. 3, the process of assembling cells and batteries in accordance with the invention is carried out with the aid of a machine generally comprising a first assembly line organized about and having parts operatively connected to a supporting frame generally designated 31 in which cut and place operations, to be described, are carried out interspersed with electrode extrusion operations in a manner to be described below. The end products of this first assembly line comprising components mounted on the frame generally designated 31 are strips of batteries interconnected by insulating laminae. These strips are supplied one at a time to an indexing section to be described, in which the individual strips are progressively advanced to a sealer. In the sealer, the batteries are sealed under vacuum with the aid of heat and pressure, and are subsequently indexed to an accumulator to allow a period of equilibration following electrochemical assembly during which the individual batteries begin to approach equilibrium to a degree permitting an initial electrical evaluation.

From the accumulator, the battery strips are advanced to a second assembly line organized about and having parts mounted on a frame generally designated 32. In the second assembly line, the batteries are first separated into individual battery units, then laminated to a pair of webs which form the external packaging components. The batteries are next tested electrically, and the values of the parameters determined for each battery are recorded on the battery in a manner more fully shown and described in U.S. application Ser. No. 227,477, filed on Jan. 22, 1981 by Sheldon A. Buckler, Jeffery B. Burns, Alfredo G. Kniazzeh and David J. Sullivan for Method and System for Testing and Sorting Batteries and assigned to the assignee of this invention now U.S. Pat. No. 4,363,407.

Finally, the batteries are separated into individual complete batteries such as those shown in FIG. 1, and packed into appropriate cartons for retesting, if desired, in the manner described in the above cited application Ser. No. 227,477, and ultimately for shipment to the intended customers.

In carrying out the process just generally described, at a number of stages in the process a web is brought up to the machine and subsequently joined to other webs. For convenience of the operators, it is generally desirable to have the web supplies located adjacent the assembly machine and at approximately the same level for access by operators in servicing and maintaining the apparatus. For this purpose, conventional unwind systems are preferably employed for handling each of the various webs. Such unwind systems may be of the type shown in FIG. 4.

Figure 4:
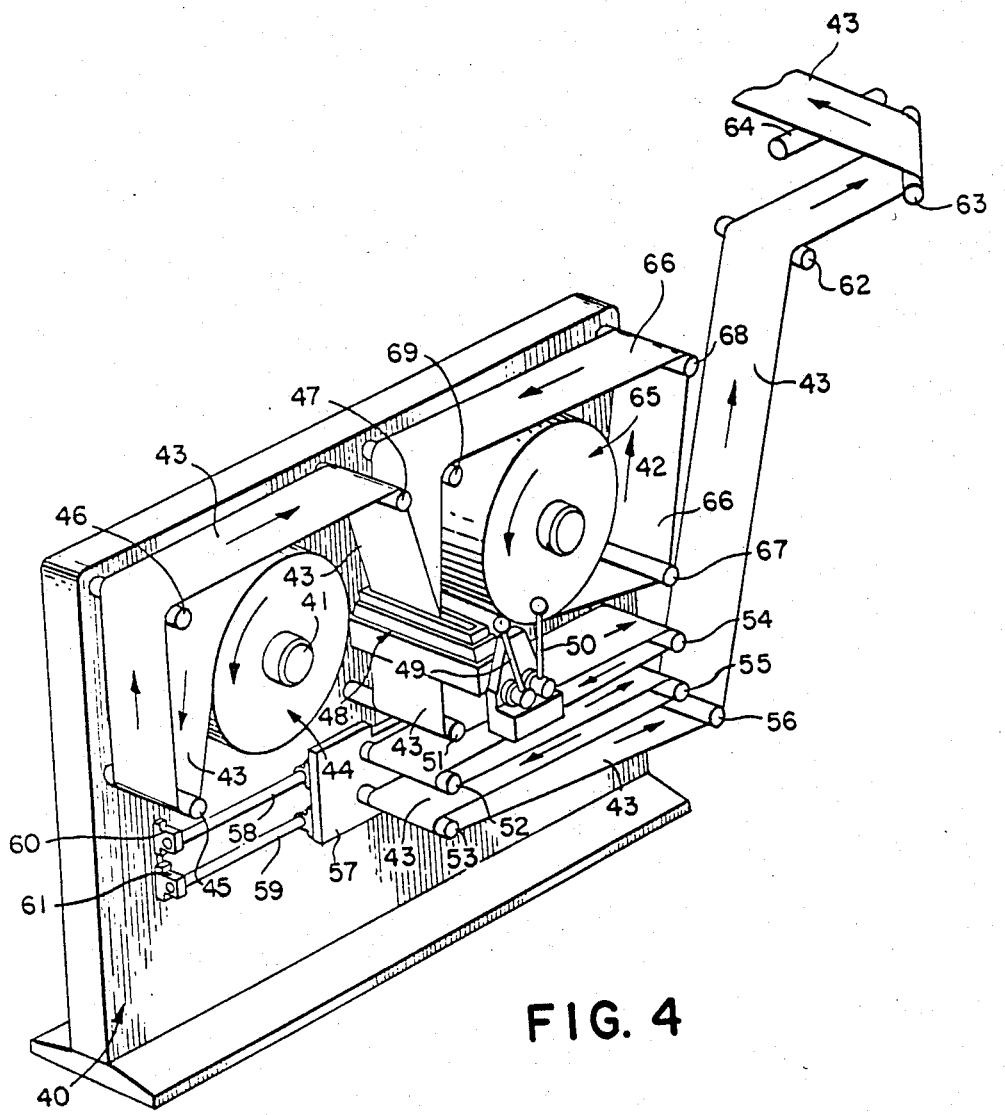
FIG. 4 is a schematic three-quarter perspective sketch of a typical unwind stand useful in the practice in the process illustrated in FIG. 3.

Referring to FIG. 4, in order to facilitate a continuous production operation, it is preferred to provide for the mounting of two supply rolls of the particular web to be handled, one of which can be fed continuously to the assembly line until it is nearly exhausted, whereupon it is replaced by the other which is spliced into the web so that the process can continue without interruption despite the changing of the web supply rolls.

As shown, the unwind system comprises a main frame 40 adapted to be mounted on and suitably secured to the floor of the enclosure in which the process takes place, and on which there are rotatably mounted a pair of supply arbors 41 and 42.

Assuming by way of illustration that the arbor 41 is currently supplying web to the process, a strip of web 43 is taken from a roll generally designated 44 disposed on the arbor 41. From the supply roll 44, the web 43 is carried over a first pair of idler rolls 45 and 46 which comprise a portion of a conventional edge guiding assembly, which may be of conventional construction and will not be described in detail, with which the path of the web 43 is constrained to the desired path.

From the second edge guide idler 46, the web 43 passes over an idler 47 and thence through a splicing assembly generally designated 48, which is inactive when the web 43 is being fed to the assembly machine. The splicing assembly 48 includes a pair of cutoff knives operated by manually actuatable levers 49 and 50. The lever 49, for example, is selectively actuatable to cut off the web 43 when the roll 44 is substantially exhausted.

While the web 43 is being supplied from the web 44, the web 43 simply passes through the splicing assembly 48, and thence to a festooning area comprising, in series, a set of idler rolls 51, 52, 53, 54, 55 and 56. Of these, the rolls 51, 54, 55 and 56 rotate about fixed axes, and the rolls 52 and 53 are mounted for rotation on a slide 57 for translation back and forth. Specifically, the idlers 52 and 53 are mounted on a slide 57 guided on bars 58 and 59, the latter being suitably secured to the frame 40 as indicated at 60 and 61. In a manner that will be apparent to those skilled in the art, the slide 57 is moved to the right or left in FIG. 4 along the guide rods 58 and 59 in such a manner as to maintain an equal tension on the web 43. The purpose of this arrangement is to serve as an accumulator during periods in which webs are being changed, so that a continuous length of web such as the web 43 can be continually fed out over the idler 56 at constant speed despite interruptions in the supply while the supply rolls are changed in a manner to be described.

From the idler 56, the web 43 passes over an idler 62, and thence around a 90° steering idler roll 63 arranged at 45° to the path of the movement of the web 43 up to the roll 63, whence the web 43 is turned at 90° to its initial path and thus in the direction of the assembly process in which it is to be employed.

The arrangement shown in FIG. 4 is typical of the several unwind stands to be described, and the web 43 may be any of the various webs to be described as brought to an assembly line and turned 90° into alignment with the machine direction.

As the roll 44 on the arbor 41 becomes depleted, the operator may place a second roll 65 of the web on the arbor 42, from whence a supply of web 66 identical to the web 43 is taken out around a pair of idlers 67 and 68 in an edge guide arrangement such as that described above and comprising the idlers 45 and 46. Over the idler 68, the web 66 passes over across the roll 65 to an idler 69, and thence down through the web splicing arrangement 48 just described. During the web change operation, the web 43 is cut off by the knife actuated by the lever 49, the end of the web 43 passing out of the machine is held in the splicing apparatus 48 while the end of the web 66 is joined to it, as by a strip of the tape or the like. During this operation, the festooning array comprising the moveable idlers 52 and 53 acts to adjust the length of the web so that it is maintained under constant tension and leaves the apparatus at constant speed during the time in which no new web is being supplied. Thereafter, following the splicing operation, the web 66 traces the path formerly followed by the web 43, and the assembly operation is continued without interruption.

Referring again to FIG. 3, the first web brought up into the assembly operation in the process of constructing cells and batteries in accordance with the invention is an elongated sheet 80 comprising a main carrier web of the insulating sheet material used to make up the insulating sheets 9 in FIG. 2. This material may be supplied from a roll generally designated 81 forming a part of an unwind stand such as that described above in connection with FIG. 4 and terminating with a steering roll to redirect the path of the web 90° into alignment with the machine process to be carried out on the bed 31.

Following perforation of the web 80 in a manner to be described below in more detail in connection with FIG. 15, segments of a composite end terminal and half-cell web 82, supplied from a roll 83, in the same manner as described for the web 80, and turned 90° into the direction of the path of the process, are added in a cut and place operation that will be described below in further detail in connection with FIG. 16. The composite end terminal and half cell web 82 comprises the material from which the subassemblies such as that comprising the metal anode terminal collector sheet 11, vents 14, frame 12a, and the components attached to the frame 12a including the conductive plastic sheet 15, its zinc anode coating 16, and the separator 20 adhered thereover in FIG. 2. This web is in turn made from a framed electrode/separator web made as will next be described in connection with FIGS. 5A and 5B and 6 through 12.

The process of making framed electrode/separator web illustrated in FIGS. 5A and 5B is carried out off line as far as the process of FIG. 3 is concerned, at an average rate commensurate with the rate of web requirements by the process of FIG. 3, which will be at a rate of batteries per unit time approximately n times the main process rate of the process illustrated in FIG. 3, where n is the number of cells in each battery to be made. Referring first to FIG. 5A, the raw materials utilized in the process of making the framed elecrode/separator web comprise a web generally designated 84 consisting of a sheet of conductive plastic coated with active electrode particles, and a web 85 consisting of a sheet of insulating frame material such as polyvinyl chloride or a conventional vinyl chloride/vinyl acetate copolymer.

The web 84 may be of any of those conventional materials that will occur to those skilled in the art, selected in dependence upon the particular electrochemical system involved in the cells or batteries being constructed, but for clarity of illustration will be illustrated in the form utilized in a presently practiced embodiment in which, referring to FIG. 6, the web 84 comprises a sheet 86 of Condulon conductive plastic 2 mils in thickness, on which there has been previously coated a layer 87 of zinc particles together with a little carbon in a binder and of the composition referred to above. The web 84 may be made by casting the conductive plastic on a suitable release sheet and drying, followed by continuously coating it with an aqueous dispersion of the zinc composition 87 and drying.

Following its manufacture in the above or any other desired manner, the web 84 is stored with its release sheet 88 on a supply roll generally designated 89 forming a portion of a web unwind, steering, tensioning and redirecting apparatus of the kind described above in connection with FIG. 4. Referring again to FIG. 5A, the release sheet 88 is stripped from the web 84 as it is wound off the supply roll 89, and wound onto an auxiliary takeup roll 90 for reuse or scrap disposal.

Following redirection into the path of the machine process illustrated in FIG. 5A, the web 84 is passed through a slitting station generally designated 91 in which it is slit into a number of parallel spaced webs corresponding to the number of batteries or cells in parallel that are to be manufactured in the process of FIG. 3. In this context, it may be remarked that the advantages of the invention are most apparent when two or more cells or batteries are to be manufactured in parallel. However, the number most suited to a particular purpose will be determined in any particular application by many considerations other than the obvious factors of projected annual volume and rate of change of volume, necessary capital investment, web speed versus down time, anticipated requirements for changes in product dimensions or materials, expected duty cycle in terms of the optimum mean number of shifts to be worked, and the like. Thus, while the decision between providing capacity for the manufacture of two or six units at a time might easily be reached on the basis of such fundamental parameters, particularly in the latter case an informed choice to set up two lines each making three at a time, three lines making two at a time, or one line making six at a time would call upon both a detailed, contemporaneous analysis and sound judgment looking to good fortune for vindication.

For clarity of illustration throughout most of the description which follows, it will be assumed that four cells or batteries are to be manufactured in parallel, and accordingly, as illustrated in FIG. 7, the web 84 is split and spread into four lanes 84a, 84b, 84c, and 84d. As illustrated in FIG. 5A, this may be accomplished by means of a knife roll 92, of stainless steel or the like, driven at an appropriate speed against a pair of counter-rotating rubber rolls 93 and 94. As illustrated, the web 84 passes around the rubber idler 93, over the knife roll 92 which slits the web 84 into the four lanes as just described, and around the backup roll 94. During this process, the conductive plastic side 86 of the web 84 is to the left as illustrated in FIG. 5A, such that the knife roll 92 first engages the conductive plastic side of the web.

The vinyl web 85 may be taken from a supply roll 95 forming a part of an unwind stand including tensioning and edge control and web redirecting apparatus of the kind described in connection with FIG. 4. The web 85 may be of any suitable insulating thermoplastic material, but, for example, may be of a conventional vinyl chloride/vinyl acetate copolymer approximately 5 mils in thickness. This web is used to make the individual frames such as 12a, 12b, 12c, and 12d, described above in connection with FIG. 2. For this purpose, as shown in FIG. 5A, the web 85 is passed through a die roll 96 operating against a vacuum anvil roll 97 with which rectangular pieces 98 of the web are punched out to form the apertures 13 ultimately provided in the frames such as 12a and 12b in FIG. 2. As illustrated in FIG. 8, the apertures 13 are provided across the web in spaced patterns arranged to receive patches of the electrode coated plastic to be made from the coated conductive plastic strips such as 84a, 84b, 84c and 84d shown in FIG. 7 following a cut-and-place operation taking place in an electrode path registration section 99 next to be described.

The strips 84a through 84d shown in FIG. 7 leave the rubber roll 94 in FIG. 5A and pass over guide rolls schematically indicated at 100 to a set of infeed nip rolls comprising a driven steel roll 101 and adjacent compliant rubber rolls 102 and 103. The steel roll 101 is driven at a rate slightly less than the rate at which the web 85 is advanced through the die roll 96 and vacuum transfer roll 97.

As illustrated, the strips 84a through 84d pass around the rubber infeed roll 102, thence clockwise around the steel drive 101 and between the roll 101 and the rubber nip roll 103, to emerge downwardly as shown in FIG. 5A with the conductive plastic side at the left as seen in FIG. 5A. Pieces of the strips 84a through 84d are then cut from the strips and transferred to the perforated web 85 in a cut and place operation.

For this purpose, the strips 84a through 84d pass between a steel die roll 104, rotating clockwise as seen in FIG. 5A, and a steel vacuum transfer roll 106. During this operation, individual pieces of the strips 84a through 84d are cut into composite electrodes 15 and 16 corresponding to those elements shown in FIG. 2.

From the vacuum transfer roll 106, the pieces are transferred to the perforated vinyl web 85 which is carried by a second vacuum transfer roll 105. As indicated in FIG. 5A, the perforated web 85 emerges from the die and transfer rolls 96 and 97, passes over a guiding idler roll 108, and thence to the vacuum transfer roll 107, which is rotating clockwise as seen in FIG. 5A, where it is held as the individual pieces of the web 84a through 84d are transferred to it.

The assembly thus provided passes between the transfer roll 107 and a heated steel tacker roll 109 that effects a temporary lamination of the conductive plastic pieces 15 to portions of the vinyl web 85 surrounding the apertures 13 which have been made therein by the rolls 96 and 97. A cross-section of the web at this stage is shown in FIG. 9, and in further detail in FIGS. 10 and 11.

Referring to FIG. 10, a progression of steps during the process just described is illustrated in which the vinyl web 85 is shown in the left section as it enters the vacuum transfer roll 107, with the apertures 13 in a row across it to correspond to four cell locations. The dashed lines 110 and 111 in FIG. 10 illustrate lines where the web will subsequently be cut, and the section between the dotted lines 110 and 111 illustrates the appearance of the web 85 following the addition of the patches 15 and 16 cut from the web strips 84a through 84d. FIG. 11 shows an enlarged cross section through the web at this stage in more detail.

Returning to FIG. 5A, from the vacuum transfer roll 107 and tacker roll 109, the web 85 with its attached pieces 15 and 16 passes over a guiding idler roll 112 to an electrode patch lamination station 113 where lamination of the conductive plastic pieces 15 to the web 85 is completed by passage through a series of heated steel rolls 114, 115 and 116 operating against white rubber backup rolls 117, 118, and 119 respectively to heat the conductive plastic pieces 15 and the adjacent web 85 to suitable temperatures to effect a mutual lamination under pressure.

From the lamination station 113, the web passes through a separator cutout and registration station 120, shown in FIG. 5B, in which the individual separators 20 are attached over the patches comprising the conductive plastic pieces 15 coated with electrode particles 16. Referring to FIG. 5B, the separator pieces 20 are made from a web 121 of suitable separator material on which parallel stripes of adhesive have been coated.

As a specific example, the web 121 may comprise PUDO cellophane 1.34 mils in thickness on which stripes of ethylene vinyl acetate adhesive arranged in parallel rows corresponding to the adhesive strips 21 have been printed, with the adhesive side up as seen in FIG. 5B as the web 121 emerges from a striped separator web unwind, steering and tensioning station 122. The station 122 may be of the kind described above in connection with FIG. 4.

As illustrated in pertinent part, the web 121 is taken from a selected supply roll 123 and passes, with the adhesive side up as seen in FIG. 5B, through a set of infeed nip rolls comprising a driven steel roll 124 working against counter-rotating rubber rolls 125 and 126. As shown, the web 121 passes over the roll 125, which rotates counter-clockwise, over the steel drive roll 124 operating clockwise, and thence between the roll 124 and the counter-clockwise rotating roll 126 over a path leading to the separator cutout and registration station 120.

The striped cellophane web 121 passes around a guide roller 135, adhesive side up, and thence through a clockwise rotating steel die roll 136 operating against a counter rotating vacuum transfer roll 137 where individual separator pieces 20 are cut out as illustrated in FIGS. 10 and 12. The pieces 20 thus cut out are carried on the transfer anvil 137, and the residual cellophane web matrix 121a from which the pieces were cut passes out over a guide roll 138 and through a pair of driven nip rolls 139 and 140 to scrap disposal.

The web 85, carrying attached pieces of conductive plastic 15 coated with electrode particles 16, passes between the vacuum transfer anvil roll 137 and a rubber backup roll 141 and there receives the pieces of separator 20 cut out and with the adhesive side down against the web 85. The composite web thus prepared then advances through a separator lamination station 142 where it passes between hot steel laminating rolls 143 and 144 operating against rubber backup rolls 145 and 146, respectively, whereby the cellophane pieces 20 are adhered to the web 85 by means of the heat and pressure activated adhesive strips 21 to assume the form shown in FIGS. 10 and 12.

In the lamination station 142, the composite web comprising the perforated vinyl sheet 85 with its patches of conductive plastic 15 coated with electrode particles 16 and overlaid with separator patches 20, now in the form of a completed composite web 130, passes into a framed electrode/separator web tensioning, steering and windup station 147, in which the web 130 passes over a pair of tensioning rolls 148 and 149 which may be relatively adjusted in the position of their rotational axes to appropriately determine the tension on the rolls, and thence through a set of outfeed nip rolls comprising a rubber roll 150, a steel drive roll 151, and a rubber idler 152, from the last of which the web 130 emerges and is rolled up on a supply roll 153.

The manufacture of the composite end terminal/half-cell web 82 utilized in the process of FIG. 3, from the framed electrode/separator web 130 manufactured as just described, will next be described in connection with FIGS. 13–15. Referring first to FIG. 13, the framed electrode/separator web 130 is taken from a supply roll 153 in an unwind, tensioning and steering station 154 which may be of the type described above in connection with FIG. 4. The web 130 leaves the supply roll 153 with the vinyl side up as seen in FIG. 13, and thence passes over a pair of idlers 155 and 156 to a laminator 157.

A series of strips of primed metal foil are supplied to a laminator 157 from a supply system beginning with a metal foil unwind, tensioning and steering station 158, which may be generally of the type described above in FIG. 4. There, a supply of primed metal foil 159 is taken from a supply roll 160. The web 159 may comprise a sheet of aluminum foil approximately 2 mils in thickness, coated on the upper side as seen in the station 158 in FIG. 13 with a thin layer of conductive plastic primer which functions to adhere other components to the metal foil substrate.

In addition to the other apparatus described above in more detail in connection with FIG. 4, the web 159 passes through a pair of driven nip rolls 161 and 162, and thence over idlers 163 and 164 to a slitter generally designated 165 into which the web 159 is slit into four parallel strips 159a, 159b, 159c, and 159d, as illustrated in FIG. 14.

As illustrated in FIG. 14, the metal side 166 of the metal strips such as 159d is on the bottom as the web 159 passes into the slitter roll, and the conductive plastic adhesive side 157 is on top. The slitter 165 comprises a steel slitter knife roll 168 operating against a rubber backing roll 169.

Strips 159a through 159d emerging from the slitter 165 pass over guide rolls 170, 171 and 172 and thence downward to the laminator 157. Strips of vent material 14 are introduced between the strips of primed metal 159a through 159b and the vinyl side of the web 130 in the laminator 157.

There are supplied to the laminator 157 two strips 14 for each row of cells or batteries to be manufactured in parallel in the process of FIG. 3. For this purpose, the supply of vent strips 14 is provided by a vent strip unwind and guidance system 73, whence the strips 14 are taken from suitable supply reels 174, one reel for each strip to be introduced into the machine. For example, in the process illustrated in which four rows of cells are manufactured in parallel, there would be eight supply reels 174 to provide eitht strips 14 spaced in a parallel array across the web 130 in position to be laminated with the strips 159a through 159b of primed aluminum. As suggested in FIG. 13, the reels 174 may be displaced in a vertical arrangement as well as in a parallel array normal to the plane of FIG. 13 depending on the desired location of the strips 14 in the laminate, to facilitate access by maintenance personnel.

The laminator 157 comprises a clockwise rotating heated steel laminating roll 175 operating against the webs being laminated in cooperation with a rubber backup roll 176. Heat supplied in the laminator 157 is sufficient to weld the primer side 167 of the web strips 159a through 159d both to the vinyl web portions 85 of the web 130 and to the intermediate conductive plastic patches 15 exposed through the apertures 13 in the web 85, as more clearly shown in FIG. 19. A more schematic version of the web 82 as it emerges from the laminator 157 as shown in FIG. 15, illustrating that the metal strips 166 are on top as seen in FIG. 13 as the composite web emerges from the laminator 157.

From the laminator 157, the web 82 passes over a chill roll 177 in a chill station 178 wherein the heated webs are cooled to dimensional stability, facilitating handling. The chill roll 177, which may be cooled with ice water or the like, is provided with an elongated contact with the aluminum side of the web 82 by means of an idler 179 that insures a substantial wrap of the web 82 around the chill roll 177; for example, about 220°.

From the idler 179, the cooled web 82 passes over an idler 180 and a guide roll 181 to a composite end terminal/half-cell web windup, tensioning and steering system 182, in which the web 82 passes over tension rolls 183 and 184 and thence through driven outfeed nip rolls 185 and 186 to be wound up on a takeup reel 83 which may serve as the supply roll in the process of FIG. 3 described above.

The process described briefly above in connection with FIG. 3, in which strips of the composite web 82 prepared as described above are laminated to the main carrier web 80, will next be described in more detail with reference to FIGS. 16 through 19.

Referring first to FIG. 16, the carrier web 80 is taken from an unwind, tensioning and steering arrangement, such as that described above in connection with FIG. 4, terminating in a 90° steering roll 195. The roll 195 corresponds in function to the roll 63 in FIG. 4, is disposed at 45° to the entering and leaving directions of the web 80, and serves to turn the web 90° into the machine direction relative to the path in FIG. 3.

Referring again to FIG. 16, the web 80 leaves the roll 195 and passes over an idler 196 operating in conjuction with an adjustable braking roll 197 to provide a desired tension to the web, or to stop the web at times desired. From the roll 196, the web 80 passes over an idler 198, and thence around a pair of edge guiding rolls 199 and 200. The rolls 199 and 200 operate in conjuction with conventional edge sensing and steering apparatus, not shown, to maintain the web 80 in a desired path in directions perpendicular to FIG. 16.

From the roll 200, the web 80 passes through a pair of driven infeed nip rolls 201 and 202, and thence around an idler 203, a dancer roll 204 of conventional design, and a guide roll 205 into the nip of a punch and die set comprising a punch roll 206 rotating counter-clockwise as seen in FIG. 16 and cooperating with a counter-rotating vacuum transfer anvil roll 207 to punch out and dispose of pieces schematically indicated at 208 from the web 80 in a desired pattern which will be more apparent in FIG. 17.

Referring to FIG. 17, a typical portion of the web 80 is shown comprising one side which may be symetrical with an opposite side, not shown, with the web 80 shown running in the direction of the arrow 209 corresponding to the machine direction in FIG. 3. The arrow 209 does not appear on the final product, or on the web 80, but is merely included for reference purposes.

As illustrated for the upper edge in FIG. 17, both edges of the web 80 are provided with partial perforations 210 in the form of U-shaped tabs which can be hinged away in response to the insertion of guide sprockets to position the web accurately, and to control its rate of advance, in its path through the apparatus to be described. In accordance with conventional practice, the partial perforations 210 are preferred to complete circles punched out of the web 80 to avoid the problem of disposing of the scrap produced by so punching out complete pieces.

Complete pieces are punched out of the web 80 to form apertures 10, here shown, for example, as of circular shape, which serve to expose battery terminals in the manner described above in connection with FIG. 2. Also punched out of the web 80 are rectangular apertures 211 which are appropriately spaced to receive the electrode tabs 5 described above in connection with FIG. 2, when the tabs 5 are folded around the battery through the apertures 211 after assembly and sealing in a manner to be described.

Referring again to FIG. 16, the perforated web 80 emerges from the die roll 206 and vacuum transfer anvil roll 207 and passes around an idler 209 operating against a compliant backup roll 210, and thence around a first sprocket roll 211 provided with sprockets schematically indicated at 212 which engage recesses provided by folding back sequential tabs 210 in the edges of the webs 80 as illustrated in FIG. 17 so that the web 80 is controlled in its position relative to other components to be described. The web 80 then passes over another sprocket roll 213, which is also provided with sprockets such as schematically indicated at 214 to engage the edge perforations in the web 80. The sprocket rolls 211 and 213 are controlled and synchronized with the other apparatus employed in the process to maintain the web 80 at constant speed throughout the processes to be described in connection with the battery assembly portion of FIG. 3. From these rolls, synchronization of auxiliary apparatus controlling the flow of additional web segments can be maintained.

The composite web 82, prepared as described above, is brought from an unwind station such as that described in connection with FIG. 4, terminating in a steering roll 215 corresponding in function to the roll 63 in FIG. 4 and arranged at 45° to the entering and exit paths of the web 82 so that the web 82 emerges running parallel to the machine direction but at first opposite to the machine direction, as indicated in FIG. 16, with the aluminum strips on the side that is uppermost as seen where the web 82 emerges from the roll 215 in FIG. 16.

From the roll 215, the web 82 passes through an idler roll 216 associated with a braking roll 217 serving to provide a desired tension in the web, or to stop the web when desired. From the rolls 216 and 217, the web 82 passes around an idler 218, thence around another idler 219 and a pair of edge guide idler rolls 220 and 221. The rolls 220 and 221 are associated with conventional edge sensing and control apparatus which serve to control the position of the web 82 in directions perpendicular to the plane of FIG. 16.

From the roll 221, the web 82 passes between a pair of oppositely driven infeed nip rolls 222 and 223, and thence around an idler 224 which guides the web 82 into the path between a knife roll 225 and a vacuum transfer anvil roll 226, between which strips of the web 82 cut off in directions perpendicular to the direction of the web 82.

The vacuum transfer anvil roll 226 carries the pieces of web 82 so cut off into registry with the web 80, which passes between the vacuum transfer anvil roll 226 and compliant rubber backup roll 227 such that the individual strips such as 82a, 82b and 82c are transferred to the web 80 in the appropriate registry in the manner shown in FIG. 18.

Referring to FIGS. 17 and 18, it will be apparent that in each strip such as 82a cut from the roll 82, the left hand edge of the vinyl web 85 will be in registry with the right hand edge of the corresponding row of rectangular apertures 211 with the circular apertures 10 beneath the vinyl sheet 85. FIG. 19 shows further details of this construction, illustrating that the carrier web 80 comprises base layers 228 of kraft paper overcoated with a thermoplastic resin as described above, and an upper adhesive layer 229 which is in contact with the metal terminal pieces 11 cut from the strips 159a through 159d on the web 82 by the knife roll 225 and each corresponding in function to the similarly designated terminal sheet 11 in FIG. 2, and forming a portion of the web segments such as 82a cut from the web 82 as described above.

Referring again to FIG. 16, from the cut and place operation just described, the web 80 carrying the strips cut from the web 82 as just described is passed through a contact hole laminator comprising a heated steel roll 230 operating against selected portions of the web and against a cooperating rubber backup roll 231 to laminate the metal terminal pieces 11 to the adhesive 229 on the carrier web 80 (FIG. 19) selectively, only in the regions within the dotted lines 232 (as illustrated in FIG. 17) immediately surrounding the terminal access ports 10 in the web 80. This selective lamination provides all of the adhesion that is actually needed without subjecting the web constituents to the unnecessary heat and pressure that would be required for a full lamination over the surfaces of the metal terminal pieces 11.

Referring again to FIG. 16, as the next step in the operation, slurry cathodes 22 are extruded over the separators 20 by means of extruders generally designated 233, with which a row of four cathode slurry patches are deposited across each of the strips such as 82a in FIG. 18, each such cathode slurry patch being deposited in registry with the anode patch such as 16 underlying each separator 20 and being deposited within the confines of the separators 20 as best shown in FIG. 2.

Referring again to FIG. 3, in which the location of the extruders 233 following the cut and place operation just described is also shown, if one cell batteries were being made, the process would jump to the stage to which the end cathode terminal is added in a manner to be described. However, assuming the manufacture of multiple cell batteries, from the extruders 233, the web 80 carrying its components added as previously described is next carried through a series of stations, one for each cell to be added to the batteries made during the process, in each stage of which strips of framed electrode/separator web 130, manufactured as described above, are added to the web 80 in a cut and place operation to be described below, and are followed by extruders 234 which again deposit a set of cathodes in each appropriate location across the web in a manner to be described. This cut and place operation in which strips of the web 130 are added, followed by the extrusion step, will next be described in more detail with reference to FIG. 20.

Referring to FIG. 20, the composite web 130 is brought in over a steering roll 235 arranged at 45° to the entering and leaving directions of the web 130 and forming a part of the unwind, tension and steering apparatus described above in connection with FIG. 4. The web 130 is vinyl side up as it emerges over the roll 235 in FIG. 20, and passes next through a braking roll 236 acting against a compliant backup roll 237 and thence over a pair of idlers 238 and 239 to a pair of edge guide rolls 240 and 241. The rolls 240 and 241 are associated with edge position detection apparatus of the conventional variety, not shown, which secures the position of the web 130 in directions normal to the plane of FIG. 20.

After passing over the roll 241, the web 130 passes through a pair of counter-rotating infeed nip rolls 242 and 243, and thence over a guiding idler 244 into the nip between a clockwise rotating steel knife roll 245 acting against a vacuum transfer anvil roll 246, cutting off strips of the web 130 and accelerating the strips to the speed of the incoming web 80 with its attached composite web strips 82 on which cathode deposits 22 have been deposited as previously described.

The web 80, carrying the strips of composite web 82 with deposits 22 of cathode slurry thereon, is brought into the cut and place apparatus through a phase control station comprising a endless timing belt 248 carrying sprocket pins 249 which engage the perforations 210 in the edges of the web 80 (FIG. 17). The timing belt 248 is driven by a pair of speed controlled pulleys 250 and 251 to maintain a constant desired speed of the web 80.

From the timing belt 248, the web 80 and its associated components pass into the nip between a vacuum transfer anvil 246 and a counter-rotating backup roll 247 of rubber or the like, in which strips of the web 130 are transferred onto the cathodes uppermost on the web 80 with the conductive plastic strips 15 forming a part of the web 130 coming into contact with the individual cathode patches 22 on the web strips 82. For this purpose, as the vacuum transfer anvil 246 rotates into contact with the web 80, with the aid of suitable valving within the roll 246, the vacuum may be broken and positive pressure so that the strips cut from the web 130 are forced into position on the corresponding cathode patches. It has been found that no additional tamping stages are required following this operation, as the wet slurry cathode patches 22 provide sufficient adhesion to the conductive plastic sheets 15 so that the structure will be maintained in registry up to the final sealing station, in which the structure is fixed in place by sealing the perimeters of the frames 12.

Each of the strips of the web 130 transferred to the components on the web 80 in the process just described have the outward appearance shown on the strip at the right of the dotted line 111 in FIG. 10. The next occurring operation, comprising the extrusion of cathode patches 22 on the separators 20 on each such strip by the extruders 234, involves the deposition of a cathode patch within the confines of each separator 20 as seen in the strip to the right of the dotted line 111 in FIG. 10, in registry with the apertures 13 in the vinyl strip 85, and in general registry with the zinc patch 16 underlying the separator 20.

Following the operation culminating with the application of additional cathode patches 22 by the extruders 234, the steps illustrated in FIG. 20 may be repeated any desired number of times in dependence on the total number of cells to be included in the batteries being manufactured. As an example, in the manufacture of four-cell batteries there would be three stages such as illustrated in FIG. 20. The next following operation comprises the addition of end terminals in a manner next to be described in connection with FIGS. 21 through 26.

The first operation carried out in the addition of end terminals is the preparation of an end terminal web, which may take place off line as far as the process illustrated in FIG. 3 is concerned, and which is illustrated in FIGS. 21, 22, and 23.

Referring first to FIG. 21, a terminal carrier web 260 is supplied from a suitable roll 261 in a terminal carrier web unwind, tension and edge control station 262 which may be of the type described above in connection with FIG. 4. The terminal carrier web 260 may be any suitable dimensionally stable, thermally insensitive and electrochemically inert material, but it is preferably of glassine paper of approximately 1-3 mils in thickness on which there is overcoated a suitable adhesive such as poly(etheylene/vinyl acetate), which would be on the upper side as the web 260 leaves the roll 261 as shown in FIG. 21.

From the unwind station 262, the web 260 passes through a set of infeed nip rolls 263, 264, and 265. The roll 264 is of steel, and is driven at a constant speed. The rolls 263 and 265 are of compliant rubber, and rotate oppositely to the direction of the driven roll 264.

From the roll 265, the web 260 passes over a guide idler 266, and thence into the nip between a punch roll 267 and a cooperating vacuum transfer anvil 268 wherein pieces 269 are cut from the web 260 and brought up by the vacuum transfer anvil down into position for transmission to waste disposal. The pieces 269 cut from the web 260 leave apertures 270 in the web 260 as shown in detail in FIG. 24. These apertures are tapered at the trailing edges, the machine direction of movement of the web 260 being indicated by the arrow 271 in FIG. 24. These apertures allow the passage of the tabs 5 through the web 260 when the tabs are folded over in the final stages of battery manufacture.

Referring again to FIG. 21, the second material supplied to the end terminal web manufacturing process comprises a web 274. As shown in FIG. 22, the web 274 may comprise a sheet of aluminum foil 275, for example of 2 mils in thickness, covered with a layer 276 of conductive plastic, such as Condulon 2 mils in thickness and laminated to the aluminum sheet 275 by means of any conventional conductive priming adhesive layer, not shown.

Referring to FIG. 21, the aluminum web 274 as taken from a suitable supply roll 277 located in an end terminal web unwind, tensioning and edge control station 278 which may be of the type described above in connection with FIG. 4. From the supply roll 277, the web passes through intermediate stages described in connection with FIG. 4 to a guide idler 257, which directs the web 274 into the nip between a steel knife roll 258, rotating clockwise as seen in FIG. 21, and operating against a vacuum transfer roll 279 to cut pieces such as 274a (shown in FIG. 25) from the web 274 and transfer them down into contact with the web 260. The web 260 is brought into the nip between the vacuum transfer roll 279 and a compliant rubber back up roll 280 to receive the patches 274a with the aluminum side of the patches 274a in engagement with the adhesive side of the glassine web 260.

The pieces 274a, as shown in FIG. 25, are somewhat distorted from their final form in plan to accomodate for distortions which will take place in the subsequent formation of the pockets 25 shown in FIGS. 1 and 2. As illustrated in FIG. 25, each of the blanks 274 is arranged on the web with the tab 5 extending over the aperture 220 with corners resting on the web 260 just beyond the triangular regions of the holes 270 and temporarily adhered thereto by the adhesive on the face of the glassine web 260 to provide temporary fixing of the tabs 5 until they will later be folded through the apertures 270 in the final stages of battery manufacture. As a practical matter, adhesion of the tabs 5 to the web at this stage has been found unnecessary, and may be omitted if so desired.

From the rolls 279 and 280, the composite web comprising the glassine web 260 carrying the pieces 274a of conductive plastic coated on aluminum, with the conductive plastic side 276 up as seen in FIG. 25, is passed through an end terminal lamination station 281 comprising a heated steel roll 282 operating against the patches 274a and the web 260 against a compliant rubber backup roll 283 to fully laminate the aluminum side of the patches 274a to the adhesive side of the glassine web 260.

From the lamination station 281, the composite web passes through an index punch station 284 as shown in FIG. 21 in which a punch roll 285 operating against a counter-rotating anvil roll 286 punches U-shaped tab portions 287 in the tab portions 5 of the blanks 274a as shown in FIG. 25. These tabs 287 may be folded out of the way to allow access of registration pins in a later stage of manufacture to be described, and are utilized in essentially the same manner as the corresponding tabs 210 punched out of the web 80 as described above. In the presently preferred practice of the invention, the index punching operation shown performed in the station 284 is carried out by incorporation of the necessary punch and die sets in the rolls 258 and 259 to obtain more accurate placement of the index apertures in the tabs 5.

Returning to FIG. 21, from the index punch station 284, the web 288 (in the form shown in FIG. 25) is passed through a set of outfeed nip rolls 290, 291, and 292. The roll 291 comprises a steel driven roll, rotated clockwise as seen in FIG. 1 at a constant speed in synchronism with the speed of the driven roll 264 in the infeed set of nip rolls, and acting against compliant rolls 290 and 292 counter-rotating with respect to the roll 291.

From the roll 292, the finished end terminal web 288 passes over a pair of tension control rolls 293 and 294, which may be adjusted in position to control the tension of the web. Following the roll 294, the scrap matrix 274b, comprising the conductive plastic coated sheet of aluminum foil from which the pieces 274a were punched, is rolled up on a suitable take-up roll 296 for recycling or other disposal. The web 288 is rolled up, with the terminal pieces 274a on the inside, onto a roll 295 that will serve as a supply roll in a later stage of manufacture next to be described.

Referring to FIG. 3, the web 288, manufactured as just described and disposed on a supply roll 295 in an unwind station of the kind described above in connection with FIG. 4, is brought into the machine and turned into the machine direction in the manner described above, and thereafter laminated to the web 80 over the components carried thereon, in a manner to be described below in connection with FIGS. 26-29. Thereafter, the laminated webs are cut into strips in spaced locations between selected rows of intermediate components at a cutoff station 340.

Comparing FIGS. 3 and 26, the web 288 is brought from the supply roll 295 in FIG. 3 into a direction parallel but opposite to the machine direction in FIG. 3 over a steering roll 300 (FIG. 26) arranged at 45° to the entering and leaving directions of the web 288 as described above. As shown in FIG. 26, from the roll 300, the web 288 passes over a pair of edge guide rolls 301 and 302, associated with conventional apparatus for maintaining the registration of the web in directions normal to the plane of FIG. 26, and thence around an idler 304 which insures an appropriate wrap around a pair of infeed nip rolls 305 and 306. The rolls 305 and 306 are driven at a constant speed to carry the web 288 into the process to be described.

From the rolls 305 and 306, the web 288 passes over a dancer roll 307, and thence over a guiding idler 308 to a creasing apparatus 309. The creaser 309 comprises a grooved platen 310 operating against creasing blades 311 and 312 mounted on an upper platen 313. The blades 311 and 312 engage the glassine web between patches 274a to form creases 314 as indicated in FIG. 27. As indicated by comparison of FIGS. 26 and 27, the central crease 314 is formed by a leading creasing blade 311 in FIG. 26, and the outer creases 314 are formed by trailing blades 312 on either side of the central blade 311, so that the central crease is initially formed to allow creep of the material before beginning the creases on either side of the blade 312. The purpose of the creases 314 is to allow for dimensional changes in the web caused by a subsequent pocketing operation on the blanks 274a without tearing of the web 314.

From the creaser 309, the web 288 passes to pocketing dies generally designated 315. The pocketing dies 315 comprise a lower reciprocating carriage 316, which moves to the right and left in an oscillating fashion as suggested in FIG. 26, carrying female die cavities 317. The cavities 317 cooperate with male die components 320 carried on an upper carriage 318, reciprocable up and down in FIG. 26 on guide posts 319 secured to the carriage 316, so that for each row of blanks 274a across the web 288, the dies 320 are brought down into contact with the conductive plastic sides of the blanks 274a, forcing the blanks into the cavities 317 to form pockets 25, as shown for example in FIG. 28. The dies 320 then rise and the dies 320 and 317 are then indexed back one pitch length to engage the next transverse row of blanks 274a. During this process, the glassine web component acts as a lubricant for the dies and aids in providing smooth pockets 25 in the blanks 274a.

From the pocketing dies 315, the web 288 next moves over an eccentric roll 321 which can be adjusted from time to time to match the path length of the web 288 to the phase of the carrier web 80. The web 80 carries the battery components to which the pocketed blanks 274a will be joined in a manner next to be described.

From the eccentric roll 321, the web 288 passes onto a gripper roll 322. The roll 322 serves as the master drive for the pocketed components on the web 288. Comparing FIGS. 26 and 28, the gripper roll 322 is formed as a many sided figure, and in practice, for example, as a 17 sided figure comprising 17 flats 323 formed about the periphery of the roll and provided at the trailing edge of each flat with index pins 324. The pins 324 register in the apertures formed by bending aside the tabs 287 (FIG. 25), and thence establish positive control over each pocketed component 274a to ensure positive registration of the web 80 despite dimensional changes taking place during the pocketing operation.

From the gripper roll 322, referring again to FIG. 26, the web 288 is engaged by pins 326 carried by a timing belt 325 that is driven by a pulley 327 and guided by an idler pulley 328. The sprocketing pins 326 also engage the apertures formed by bending aside the tabs 287 of FIG. 25 and thus ensure indexing and registry of the pockets on the web 288 with cathodes 22 that are uppermost on the web 80 following the strip addition and extrusion operations described above.

The web 80, carrying its several components including the various strips cut from the webs 82 and 130 and intermediate and superposed cathode deposits 22, is brought into registry with the web 288 under the control of a timing belt 329 carrying index pins 330. The pins 330 engage the apertures formed by bending aside the tabs 210 (FIG. 17) at the edges of the web 80. The timing belt 329 is driven by a pulley 332 and guided by an idler pulley 331 to move the web 80 and the components assembled thereon at constant speed through a laminating station.

As best shown in FIG. 29, as the webs 288 and 80 approach registry, each of the pockets 25 is arranged to engage the uppermost cathode 22 of the stack of components on the web 80 in registry, and is brought down into engagement therewith. The thickness of the components on the web 80 has been greatly exaggerated in FIG. 29 to facilitate showing the typical structure involved. The actual thickness of the assembled components may be in the neighborhood of 150-200 mils.

The glassine sheet 260 forming a part of the web 288 is next laminated to portions of the carrier web 80 between battery components, and for example, along lines such as indicated by the arrows 400 transversely of the web 260 in FIG. 25, and corresponding locations 400 across the web 80 as shown in FIG. 18.

The result is a composite web 338 as indicated in FIG. 26 in which the two insulating carrier webs 80 and 260 are intermittently joined to form an endless chain of assembled battery components.

The web 338 is passed through a cutoff station 340, shown schematically in FIG. 26 as comprising a reciprocating and counter-clockwise rotating knife roll 335 carrying a knife 336 which at times works against a counter rotating backup roll 337, of rubber or the like, to cut off strips 339 of assembled battery components by severing the webs 260 and 80 between assembled batteries to form a desired number of interconnected assembled batteries for subsequent conveyance to a sealer as a unit. The number of unsealed but assembled batteries on such a strip 339 will determine the available sealing time relative to the web speed on the assembly line based on the frame 31 in FIG. 3.

Specifically, if the process of FIG. 3 is run at a web speed such that n batteries per minute are being manufactured with rows of m batteries being manufactured in parallel, and the strips 339 contain r rows of m batteries, then the sealing time available will be mr/n minutes per battery, less transit times and sealer startup and shutdown times. As a specific example, the manufacture of four batteries in parallel at a rate of n=400 batteries per minute with 18 rows of four batteries on each strip 339 will give a sealing time of approximately 0.18 minutes, or 10.8 seconds, of sealing time available.

Comparing FIGS. 26 and 3, each strip 339 of assembled but unsealed batteries emerging from the cutoff station 340 is advanced in the direction of the vertical arrow in FIG. 3 onto a first indexing station 345a, as by a conventional vacuum accelerator belt, where it will normally be maintained for the residence time established as described above; for example, for 10.8 seconds less transit time. If desired, and preferably, the indexing station 345a may be controlled to eject a particular strip 339 following evaluation or testing, which may be conducted upstream during assembly or upon arrival at the station 345a, to cause ejection of a particular strip 339 into a disposal bin, not shown, provided adjacent the end of the station 345a.

Following its residence time at the index station 345a, vacuum at that station is interrupted and conventional transfer arms, not shown, convey the strip 339 to a second indexing station 345b, where it is again held for a suitable residence time. The strip 339 is indexed again to a third indexing station 345c in a same manner and following appropriate residence time is indexed again onto an index station 345d, not shown, within a sealer generally designated 346. During residence in the sealer, the battery components on the strip 339 are sealed under vacuum in an essentially conventional manner which will next be briefly described.

The sealer 346 comprises an evacuable vacuum chamber which is opened to receive each strip 339, and then closed and evacuated to a vacuum of for example, preferably about 28 inches of mercury, corresponding to a battery pressure of about 1 inch of mercury. Following closure and evacuation of the chamber, an upper set of platens comes down on the batteries and tamps them to aid in excluding air from between the components. The tamping action, together with the applied vacuum, force the internal components into intimate contact in the form indicated in FIG. 2. The pressure exerted on the batteries at this time may be about 1 pound per square inch.

A set of lower platens then raise, and both upper and lower platens are heated, with the lower platens being heated for example to 420° F., and the upper platens being heated to 400° F., while the platens engage the batteries under a pressure of, for example, 325 psi in the seal area. The peripheries of the batteries are thereby sealed to join the peripheries of the frames such as 12a, 12b, 12c, and 12d in FIG. 2, and adjacent adhesive surfaces, together to form a hermetically sealed battery unit. Thereafter, the vacuum chamber is vented, after which the lower platens are dropped down, and the upper platens are raised. Finally, the chamber is opened to complete the operation, following which the sealed strip of batteries 339 is indexed to a station 345e where it remains for the dwell time established as described above.

The sealed strip of batteries is subsequently indexed, as to stations 345f and 345g, at each of which the sealed strip dwells while cooling of the sealed batteries continues with the internal components of the batteries being held together under a pressure approximately equal to atmospheric pressure.

While any desired number of indexing stations 345 may be provided, in practice nine such stations 345 have been provided, with four stations 345 ahead of the sealer 346 and four stations 345 following the sealer 346.

From the last index station, shown as 345g, the sealed batteries on the strips 339 are deposited into a basket 347a, one at a time, until p such strips have been deposited in the basket 347a. The basket 347a is that one of a group which has most recently been indexed into the position shown by a movement to the left in the direction of the horizontal shown in FIG. 3, where the basket waits in an initial empty condition until p battery strips have been transferred to it.

The filled basket 347a is then indexed downwardly as indicated in FIG. 3 to a location 347b, where it waits for a residence time determined by the number p and the rates described above. To continue the example given above, if the batteries are being manufactured at a rate n per minute with m batteries in parallel and the strips 339 contain r batteries, the capacity p of strips 339 in each of the baskets 347 determines a residence time in each basket that is equal to mrp/n. For example, if 400 batteries per minute are being manufactured with 4 batteries in parallel and 18 rows of batteries per strip 339, and there are 100 strips 339 in each basket, the residence time in each basket such as 347a is $4 \times 18 \times 100/400 = 18$ minutes per basket. In the illustrated example, the accumulator 348 contains 11 baskets 347, of which there are 7 baskets in locations 347a through 347g which are occupied by the battery strips between loading and unloading of the accumulator. Thus, there are $7 \times 18$ or 126 minutes of storage time in the accumulator 348 during which the batteries approach equilibrium by diffusion of the electrolyte from the cathode slurries 22 in FIG. 2 through the cellophane separators 20 into permeation of the anodes 16. This residence time may be adjusted readily by adjusting the contents and number of the baskets 347 to provide any desired equilibration time before advancing the completed batteries through subsequent stages to be described.

Referring again to FIG. 3, when a basket load of battery strips 339 has advanced to the station 347g, its contents are unloaded one strip 339 at a time, and each such strip is advanced by an accelerating vacuum belt into a final assembly line based on a bed generally designated 32 and beginning with a crosscut station 349 in which, following bending over of the tabs 5 into the position shown in FIG. 2, as by cooperating fingers, not shown, each strip 39 is cut across the machine direction into strips 350 of, in the example shown for simplicity in FIG. 3, three batteries across. These strips 350 are then advanced to a station 351 in which they are split in the machine direction into groups of three individual unpackaged batteries 352 in parallel. The individual batteries 352 are aligned into spaced parallel rows by means indicated at 353 of any conventional design such that they are appropriately ranked for lamination, first to a card stock web 354 of the material used to make the cards 2 on which the batteries are ultimately mounted as shown in FIG. 2. The card stock web 354 is brought from a supply roll 355 by an unwind guiding and tensioning system such as that shown in FIG. 4, turned into the machine direction and laminated to the batteries 352.

Immediately thereafter, a web 356 of the overwrap material forming the upper layer 6 in FIG. 2, such as polyethylene or the like, is brought from a supply roll 357 in an unwind station of the kind described in FIG. 4 and laminated to the other side of the assembled batteries. Thereafter, as briefly described above, the batteries joined by the dual webs 354 and 356 are passed through test and record stations, thence to a crosscut station 360 where they are split into parallel rows 361 of completed batteries, and finally through a splitting station 362 where a rotary knife separates them into individual batteries 1 of the kind shown in detail in FIGS. 1 and 2.

While the invention has been described with respect to the details of specific illustrative and preferred embodiments, many changes and variation will occur to those skilled in the art upon reading this description, and such can obviously be made without departing from the scope of the invention.

Having thus described the invention, what is claimed is:

1. The process of making laminar cells, comprising the steps of perforating a first elongated web of liquid impervious, electrically nonconducting thermoplastic material with a spaced rectangular array of apertures arranged in rows across the direction of elongation of said web and in columns parallel to the direction of elongation of said web, adding patches of electrically conductive material each comprising a sheet of conductive plastic adhered to a coterminous layer of electrode particles in a binder to a first side of said first web with the conductive plastic side of each patch in contact with the borders of a different one of said apertures to form a spaced rectangular array of said patches on said first web, adhering a piece of separator material to said first web over each of said patches on said first side of said first web, placing spaced elongated strips of metal on said first web on a second side of said first web opposite said first side, said metal strips being aligned with and each overlying a different one of said columns, laminating said strips to contiguous portions of said first web and to portions of the conductive plastic sides of said patches within said apertures, advancing said first web into registry with a second web of nonconducting material while advancing said second web at constant speed, severing strips from said first web between said rows and transferring said severed strips to said second web in spaced parallel rows each perpendicular to the direction of advance of said second web, extruding deposits of slurry electrode material onto each of said pieces of separator material, placing a piece of conductive terminal material comprising a layer of metal adhered to a layer of conductive plastic over each deposit of slurry electrode material with the conductive plastic layer of each terminal piece in contact with the slurry, each piece of said terminal material having borders extending beyond the borders of said slurry deposits and the underlying electrode patches and overlying confronting regions of said first web but spaced from each adjacent terminal piece, and adhering the borders of said terminal pieces to said first web to form sealed cells.

2. In the process of making laminar batteries, the steps of perforating a first elongated web of liquid impervious, electrically nonconducting thermoplastic material with a spaced rectangular array of apertures arranged in rows across the direction of elongation of said web and in columns parallel to the direction of elongation of said web, adding patches of electrically conductive material each comprising a sheet of conductive plastic adhered to a coterminous layer of electrode particles in a binder to a first side of said first web with the conductive plastic side of each patch in contact with the borders of a different one of said apertures to form a spaced rectangular array of said patches on said first web, adhering a piece of separator material to said first web over each of said patches on said first side of said first web, placing spaced elongated strips of metal on said first web on a second side of said first web opposite said first side, said metal strips being aligned with and each overlying a different one of said columns, and laminating said strips to contiguous portions of said first web and to portions of the conductive plastic sides of said patches within said apertures.

3. In the process of making laminar batteries, the steps of perforating a first elongated web of liquid impervious, electrically nonconducting thermoplastic material with a spaced rectangular array of apertures arranged in rows across the direction of elongation of said web and in columns parallel to the direction of elongation of said web, adding patches of electrically conductive material each comprising a sheet of conductive plastic adhered to a coterminous layer of electrode particles in a binder to a first side of said first web with the conductive plastic side of each patch in contact with the borders of a different one of said apertures to form a spaced rectangular array of said patches on said first web, adhering a piece of separator material to said first web over each of said patches on said first side of said first web, placing spaced elongated strips of metal on said first web on a second side of said first web opposite said first side, said metal strips being aligned with and each overlying a different one of said columns, laminating said strips to contiguous portions of said first web and to portions of the conductive sides of said patches within said apertures, advancing said first web into registry with a second web of nonconducting material while advancing said second web at constant speed, severing strips from said first web between said rows and transferring said severed strips to said second web in spaced parallel rows each perpendicular to the direction of advance of said second web, and extruding deposits of slurry electrode material onto each of said pieces of separator material.

4. In the process of making laminar cells, the steps of perforating a first elongated web of liquid impervious, electrically nonconducting thermoplastic material with a spaced rectangular array of apertures arranged in rows across the direction of elongation of said web and in columns parallel to the direction of elongation of said web, adhering patches of electrically conductive material each comprising a sheet of conductive plastic adhered to a coterminous layer of electrode particles in a binder to a first side of said first web with the conductive plastic side of each patch in contact with the borders of a different one of said apertures to form a spaced rectangular array of said patches on said first web, placing spaced elongated strips of metal on said first web on a second side of said first web opposite said first side, said metal strips being aligned with and each overlying a different one of said columns, laminating said strips to contiguous potions of said first web and to portions of the conductive sides of said patches within said apertures, advancing said first web into registry with a second web of nonconducting material while advancing said second web at constant speed, severing strips from said first web between said rows and transferring said severed strips to said second web in spaced parallel rows each perpendicular to the direction of advance of said second web, and adhering said strips to said second web.

5. In the process of making laminar bateries, the steps of perforating a first elongated sheet of liquid impervious, electrically nonconducting thermoplastic material with a spaced rectangular array of apertures arranged in rows across the direction of elongation of said sheet and in columns parallel to the direction of elongation of said sheet, adhering patches of electrically conductive material each comprising a sheet of conductive plastic adhered to a coterminous layer of electrode particles in a binder to a first side of said first sheet with the conductive plastic side of each patch in contact with the borders of a different one of said apertures to form a spaced rectangular array of said patches on said first sheet, adhering a piece of separator material to said first web over each of said patches on said first side of said first sheet to form a first composite web, placing spaced elongated strips of metal on an elongated strip of said first composite web on a second side of said first sheet opposite said first side, said metal strips being aligned with and each overlying a different one of said columns, laminating said strips to contiguous portions of the conductive sides of said patches within said apertures to form a second composite web, advancing said second composite web into registry with a second elongated sheet of nonconducting material while advancing said second sheet at constant speed, severing strips from said second composite web between said rows and transferring said severed strips to said second sheet in spaced parallel rows each perpendicular to the direction of advance of said second sheet, extruding deposits of slurry electrode material onto each of said pieces of separator material, advancing an elongated strip of said first composite web into registry with the slurry deposits on said strips of said second composite web on said second sheet while continuing to advance said second sheet at constant speed, severing strips of said first composite web between said rows on said first composite web, and transferring said strips severed from said first composite web into registry with slurry deposits carried by said second sheet.

6. In the process of making laminar batteries, the steps of perforating a composite web comprising an elongated sheet of thermoplastic liquid impermeable electrically insulating material with a spaced rectangular array of apertures extending in rows across said sheet and in columns along said sheet, adhering an electrode assembly to said sheet around the peripheries of each of said apertures, each electrode assembly comprising a piece of electrically conducting electrochemically inert thermoplastic sheet material uniformly coated on one side opposite the side adjacent said elongated sheet with a layer of electrochemically active particles in a binder, adhering a plurality of sheets of cellophane to said elongated sheet each over a different one of said electrode assemblies and confronting the electrode particle coating on the adjacent electrode assembly, said cellophane sheets having peripheries extending beyond the boundaries of said electrode assemblies, each sheet of cellophane being adhered to confronting regions of said elongated sheet by spaced strips of adhesive material parallel to said columns, adhering spaced elongated strips of metal foil to said elongated sheet of insulating material on the side opposite said electrode assemblies while each strip is arranged in registry with and has peripheries extending beyond the boundaries of a different column of said apertures in the direction of elongation of said insulating sheet, and adhering said metal strips to the conductive plastic sheet materials of the adjacent electrode assemblies in regions within the boundaries of the apertures in the associated columns.

* * * * *